US012573694B2

(12) United States Patent
Patel et al.

(10) Patent No.: US 12,573,694 B2
(45) Date of Patent: Mar. 10, 2026

(54) CURRENT COLLECTOR ASSEMBLY WITH AN ELONGATED FUSE

(71) Applicant: Rivian IP Holdings, LLC, Irvine, CA (US)

(72) Inventors: Neil Patel, Costa Mesa, CA (US); Kyle Butterfield, Ladera Ranch, CA (US); Akshay Kishor Murkute, Irvine, CA (US); Najmeh Rahimi, Huntington Beach, CA (US); Kenton Robert Harris, Bloomington, IL (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/586,356

(22) Filed: Feb. 23, 2024

(65) Prior Publication Data

US 2025/0007131 A1     Jan. 2, 2025

Related U.S. Application Data

(60) Provisional application No. 63/511,609, filed on Jun. 30, 2023.

(51) Int. Cl.

| | |
|---|---|
| *H01M 50/152* | (2021.01) |
| *H01M 50/107* | (2021.01) |
| *H01M 50/213* | (2021.01) |
| *H01M 50/24* | (2021.01) |
| *H01M 50/583* | (2021.01) |
| *H01M 50/664* | (2021.01) |

(52) U.S. Cl.
CPC ....... *H01M 50/152* (2021.01); *H01M 50/107* (2021.01); *H01M 50/213* (2021.01); *H01M 50/24* (2021.01); *H01M 50/583* (2021.01); *H01M 50/664* (2021.01); *H01M 2220/20* (2013.01)

(58) Field of Classification Search
CPC ............. H01M 50/583; H01M 50/526; H01M 2220/20
See application file for complete search history.

(56) References Cited

U.S. PATENT DOCUMENTS

| | | | | |
|---|---|---|---|---|
| 5,495,889 | A | 3/1996 | Dubelloy | |
| 5,977,859 | A * | 11/1999 | Kawamura | .......... H01H 85/044 337/290 |

(Continued)

FOREIGN PATENT DOCUMENTS

| | | |
|---|---|---|
| FR | 2705085 | 11/1994 |
| WO | WO 2018/174621 | 9/2018 |
| WO | WO 2019/054765 | 9/2019 |

*Primary Examiner* — Michael L Dignan
(74) *Attorney, Agent, or Firm* — BAKERHOSTETLER

(57) ABSTRACT

A current collector assembly includes an electrically conductive layer with several tabs used to electrically couple with one or more battery cells. The tabs may connect to an interconnect of the electrically conductive layer by way of a fuse. Several fuses may include portions of difference sizes. For example, one portion of the fuse may be relatively longer and narrower, while another portion of the fuse may be shorter and wider. The narrower portion may be positioned between insulating layers of the current collector assembly, while the wider portion extends from the insulating layers. The wider portion of the fuse increases the likelihood of the fuse remaining intact when various forces are exerted on the fuse.

20 Claims, 16 Drawing Sheets

(56) References Cited

U.S. PATENT DOCUMENTS

| | | | | |
|---|---|---|---|---|
| 8,580,428 | B2 | 11/2013 | Kiyama | |
| 8,897,010 | B2 | 11/2014 | Shepard | |
| 8,991,478 | B2 | 3/2015 | Zaffetti | |
| 8,999,548 | B2 | 4/2015 | Sun et al. | |
| 9,147,875 | B1 | 9/2015 | Coakley | |
| 9,545,010 | B2 | 1/2017 | Coackley et al. | |
| 9,568,257 | B2 | 2/2017 | Moruzzi | |
| 9,844,148 | B2 | 12/2017 | Coakley | |
| 10,180,289 | B2 | 1/2019 | Vanderwees | |
| 10,211,443 | B2 | 2/2019 | Coackley et al. | |
| 10,297,813 | B2 * | 5/2019 | Takano | H01M 50/512 |
| 10,714,730 | B2 | 7/2020 | Tyler et al. | |
| 10,964,931 | B2 | 3/2021 | Coackley et al. | |
| 11,116,070 | B2 | 9/2021 | Coakley | |
| 11,133,538 | B2 | 9/2021 | Ge et al. | |
| 11,134,590 | B2 | 9/2021 | Wang | |
| 11,201,364 | B2 * | 12/2021 | Kawakami | H01M 50/51 |
| 11,302,997 | B2 | 4/2022 | Wynn et al. | |
| 11,894,580 | B2 | 2/2024 | Coakley | |
| 11,979,976 | B2 | 5/2024 | Coakley | |
| 12,035,459 | B2 | 7/2024 | Coakley | |
| 12,040,511 | B2 | 7/2024 | Coakley | |
| 2011/0008654 | A1 | 1/2011 | Kim | |
| 2011/0027644 | A1 | 2/2011 | Kiyama | |
| 2011/0095859 | A1 * | 4/2011 | Shibata | H01H 85/044 |
| | | | | 29/623 |
| 2012/0003508 | A1 | 1/2012 | Narbonne | |
| 2012/0107663 | A1 | 5/2012 | Burgers | |
| 2013/0071720 | A1 | 3/2013 | Zahn | |
| 2013/0244077 | A1 | 9/2013 | Palanchorn | |
| 2013/0337291 | A1 | 12/2013 | Mayer | |
| 2015/0364744 | A1 * | 12/2015 | Takano | H01M 50/509 |
| | | | | 429/61 |
| 2016/0025428 | A1 | 1/2016 | Hendriz | |
| 2016/0204486 | A1 | 7/2016 | Kenney | |
| 2016/0315304 | A1 * | 10/2016 | Biskup | H01M 50/507 |
| 2016/0315365 | A1 | 10/2016 | Vanderwees | |
| 2017/0244143 | A1 | 8/2017 | Burgers | |
| 2017/0256826 | A1 | 9/2017 | Hong | |
| 2018/0205125 | A1 | 7/2018 | Bergers | |
| 2018/0252479 | A1 | 9/2018 | Kenney | |
| 2018/0294449 | A1 * | 10/2018 | Zeng | H01M 50/519 |
| 2018/0337434 | A1 | 11/2018 | Burgers | |
| 2018/0375077 | A1 | 12/2018 | Shin | |
| 2019/0109357 | A1 | 4/2019 | Kenney | |
| 2019/0366876 | A1 | 12/2019 | Cheadle | |
| 2020/0067056 | A1 | 2/2020 | Wynn et al. | |
| 2020/0076022 | A1 * | 3/2020 | Kawakami | H01M 50/581 |
| 2020/0136205 | A1 | 4/2020 | Graves | |
| 2020/0185686 | A1 | 6/2020 | Ng | |
| 2020/0203941 | A1 * | 6/2020 | Ing | H05K 1/118 |
| 2020/0243934 | A1 | 7/2020 | Galvis | |
| 2021/0175588 | A1 * | 6/2021 | Coakley | H05K 1/118 |
| 2021/0226260 | A1 * | 7/2021 | Moon | H01M 10/425 |
| 2021/0242516 | A1 | 8/2021 | Rahim | |
| 2021/0247145 | A1 | 8/2021 | Vakilimoghaddam | |
| 2021/0254895 | A1 | 8/2021 | Vakilimoghaddam | |
| 2022/0021048 | A1 | 1/2022 | Boddakayala | |
| 2022/0120518 | A1 | 4/2022 | Vanderwees | |
| 2022/0123442 | A1 * | 4/2022 | Xu | H01M 10/425 |
| 2022/0131212 | A1 | 4/2022 | Collins | |
| 2022/0190445 | A1 | 6/2022 | Wynn et al. | |
| 2022/0311103 | A1 * | 9/2022 | Findlay | H01M 50/526 |
| 2022/0336883 | A1 | 10/2022 | Galvis | |
| 2023/0111495 | A1 | 4/2023 | Jung | |
| 2023/0216147 | A1 | 7/2023 | Yoon | |
| 2023/0335853 | A1 | 10/2023 | Davis | |
| 2023/0378561 | A1 | 11/2023 | Totman | |

* cited by examiner

100

110  120  120  115  120  120  120  115

102  102

100

800

PROVIDE AN ELECTRICALLY CONDUCTIVE
LAYER                                                    802

FORM A TAB IN THE ELECTRICALLY
CONDUCTIVE LAYER, THE TAB CONFIGURED TO
ELECTRICALLY COUPLE WITH A BATTERY CELL       804
OF ONE OR MORE BATTERY CELLS

FORM A FUSE IN THE ELECTRICALLY
CONDUCTIVE LAYER SUCH THAT THE FUSE IS        806
CONNECTED TO THE TAB

CURRENT COLLECTOR ASSEMBLY WITH AN ELONGATED FUSE

CROSS-REFERENCE TO RELATED APPLICATION(S)

This application claims the benefit of priority to U.S. Provisional Application No. 63/511,609, filed on Jun. 30, 2023, titled "BATTERY SUBASSEMBLY," the disclosure of which is incorporated herein by reference in its entirety.

INTRODUCTION

Batteries are often used as a source of power, including as a source of power for electric vehicles that include wheels that are driven by an electric motor that receives power from the batteries. A battery may include several battery cells carried within a module and/or a carrier.

Aspects of the subject technology can help to improve the durability and longevity of batteries of electric vehicles, which can help to mitigate climate change by reducing greenhouse gas emissions.

SUMMARY

A current collector assembly (CCA) may include several fuses, some of which include elongated portions. In particular, fuses connected to tabs used with positive terminals (of a battery cell) include portions that are generally longer and straighter as compared to, for example, fuses used with tabs connected to negative terminals. The longer and straighter fuse portions may also be relatively thin as compared to other fuse portions that are relatively wider. Additionally, the CCA includes isolating layers (e.g., laminate layers) that cover, or at least substantially cover, the relatively thin portions of the fuses, while the wider fuse portion extend, or emerge, from the isolating layers. Beneficially, the wider fuse portions that are uncovered by the isolating layers can better withstand issues such as breaking, warping, or tearing such as during shipping and/or welding operations, or during operation of a vehicle.

In accordance with one or more aspects of the present disclosure, an apparatus is described. The apparatus may include a current collector assembly that includes an electrically conductive layer. The electrically conductive layer may include a tab configured to be connected to a terminal of a battery cell. The electrically conductive layer may further include a fuse that includes a first portion extending, from an interconnect of the electrically conductive layer, along a first axis and having a first width perpendicular to the first axis. The fuse further may further include a second portion connected to the tab and extending along a second axis and having a second width perpendicular with respect to the second axis. The second axis may be different from the first axis.

The apparatus may further include a first insulating layer. The first insulating layer may cover the first portion. The apparatus may further include a second insulating layer. The second insulating layer may be coupled with the first insulating layer, and the first insulating layer and the second insulating layer may cover the first portion and partially cover the second portion. The second insulating layer may include an edge portion, and the second portion may bend over the edge portion.

The first portion may include a straight portion parallel with respect to the interconnect and disposed between the interconnect and the tab. The second portion may be non-parallel with respect to the interconnect. The tab, the fuse, and the interconnect may form in part the current collector assembly configured to collect electrical current from one or more battery cells, including the battery cell, electrically coupled with the current collector assembly.

The first width may be less than 1 millimeter, and the second width may be 3 to 5 millimeters. The second width may be at least three times greater than the first width.

In accordance with one or more aspects of the present disclosure, a battery subassembly is described. The battery subassembly may include a current collector assembly electrically coupled with one or more battery cells. The currently collector assembly may include an electrically conductive layer that includes: a first tab electrically coupled with a battery cell of the one or more battery cells, as well as a fuse connected to the first tab. The fuse may include a first portion extending along a first direction and having a first width. The fuse may further include a second portion extending along a second direction different from the first direction and having a second width greater than the first width.

The battery subassembly may further include a second tab. The first tab may be configured to electrically and mechanically couple with a positive terminal of the battery cell, and the second tab may be configured to electrically and mechanically couple with a negative terminal of the battery cell.

The battery subassembly may further include a first insulating layer a second insulating layer. The first portion may be enclosed by the first insulating layer and the second insulating layer. The second portion may gradually widen as the second portion extends away from the first insulating layer and the second insulating layer.

The currently collector assembly may further include an interconnect, and the first portion of the first tab may be connected to the interconnect. The first portion may be parallel with respect to the interconnect, and the second portion may be perpendicular with respect to the interconnect. The current collector assembly may further include a thermal collector that extends from the interconnect. The thermal collector may be configured to receive thermal energy generated in the electrically conductive layer. The second width is at least three times greater than the first width.

In accordance with one or more aspects of the present disclosure, a vehicle is described. The vehicle may include a battery subassembly that includes a current collector assembly electrically coupled with one or more battery cells. The currently collector assembly may include a tab electrically coupled with a battery cell of the one or more battery cells. The currently collector assembly may further include a fuse connected to the tab. The fuse may include a first portion extending along a first direction and having a first width. The fuse may further include a second portion extending along a second direction different from the first direction and having a second width greater than the first width. The current collector assembly may further include a first insulating layer. The current collector assembly may further include a second insulating layer. The first portion may be enclosed by the first insulating layer and the second insulating layer, and the second portion may extend from the first insulating layer and the second insulating layer.

The second insulating layer may include an edge portion, and the second portion may bend over the edge portion. The first portion may be perpendicular with respect to the second portion. The tab may be electrically coupled with a positive terminal of the battery cell.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

This disclosure is directed to CCAs for battery packs, including battery subassemblies and/or battery modules for vehicles. In particular, CCAs may include an electrically conductive layer designed to couple (e.g., electrically and mechanically) with several battery cells. In this regard, electrically conductive layers described herein may include an interconnect and several tabs extending from the interconnect, with each of the tabs electrically coupling with one or more battery cells. Electrically conductive layers described herein may further include fuses, or fuse necks, with each fuse connecting a tab to the interconnect. Several fuses may be elongated and narrow in some portions, while other portions may shorter and widened. The elongated portions may be covered (e.g., surrounded) by insulating layers (e.g., electrically insulating layers, electrically inert layers), while at least some regions of the widened portions may extend from the insulating layers. The widened portions may provide additional material while remaining movable (e.g., foldable) so as to be positioned on or near a battery cell.

Figure 1A:
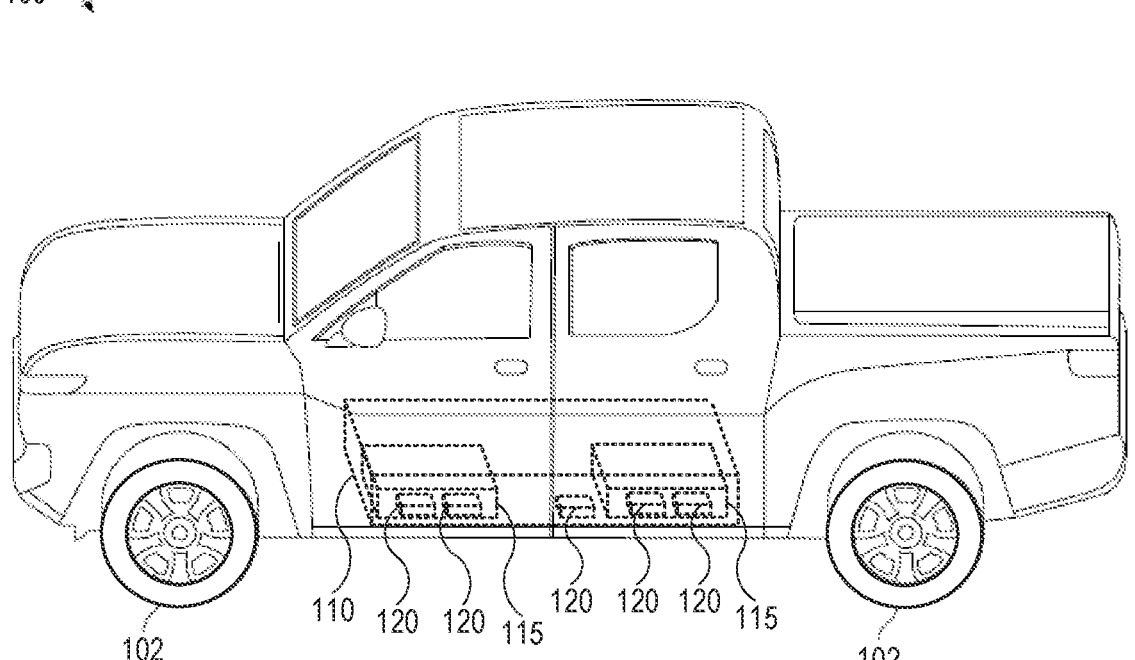
FIG. 1A and FIG. 1B illustrate schematic perspective side views of example implementations of a vehicle having a battery pack, in accordance with one or more implementations of the present disclosure.

FIG. 1A illustrates an example implementation of a moveable device as described herein. In the example of FIG. 1A, a moveable device is implemented as a vehicle 100. As shown, the vehicle 100 may include one or more battery packs, such as battery pack 110. The battery pack 110 may be coupled to one or more electrical systems of the vehicle 100 to provide power to the electrical systems.

In one or more implementations, the vehicle 100 may be an electric vehicle having one or more electric motors that drive the wheels 102 of the vehicle 100 using electric power from the battery pack 110. In one or more implementations, the vehicle 100 may also, or alternatively, include one or more engines, or motors, including chemically-powered engines, such as a gas-powered engine or a fuel cell powered motor. For example, in one or more implementations, the vehicle 100 includes one or more electric motors, and the vehicle 100 takes the form of a fully electric or partially electric (e.g., hybrid or plug-in hybrid) vehicle.

In the example of FIG. 1A, the vehicle 100 is implemented as a truck (e.g., a pickup truck) having a battery pack 110. As shown, the battery pack 110 may include one or more battery modules 115, which may include one or more battery cells 120. As shown in FIG. 1A, the battery pack 110 may also, or alternatively, include one or more battery cells 120 mounted directly in the battery pack 110 (e.g., in a cell-to-pack configuration). In one or more implementations, the battery pack 110 may be provided without the battery modules 115 and with the battery cells 120 mounted directly in the battery pack 110 (e.g., in a cell-to-pack configuration) and/or in other battery units that are installed in the battery pack 110. The battery pack 110 may include multiple energy storage devices that can be arranged into such as battery modules or battery units. A battery unit or module can include an assembly of cells that can be combined with other elements (e.g., structural frame, thermal management devices) that can protect the assembly of cells from heat, shock and/or vibrations.

Each of the battery cells 120 may be included a battery, a battery unit, a battery module and/or a battery pack to power components of the vehicle 100. For example, a battery cell housing of the battery cells 120 can be disposed in the battery module 115, the battery pack 110, a battery array, or other battery unit installed in the vehicle 100.

As discussed in further detail hereinafter, the battery cells 120 may be provided with a battery cell housing that can be provided with any of various outer shapes. The battery cell housing may be a rigid housing in some implementations (e.g., for cylindrical or prismatic battery cells). The battery cell housing may also, or alternatively, be formed as a pouch or other flexible or malleable housing for the battery cell in some implementations. In various other implementations, the battery cell housing can be provided with any other suitable outer shape, such as a triangular outer shape, a square outer shape, a rectangular outer shape, a pentagonal outer shape, a hexagonal outer shape, or any other suitable outer shape. In some implementations, the battery pack 110 may not include modules (e.g., the battery pack may be module-free). For example, the battery pack 110 can have a module-free or cell-to-pack configuration in which the battery cells 120 are arranged directly into the battery pack 110 without assembly into a battery module 115. In one or more implementations, the vehicle 100 may include one or more busbars, electrical connectors, or other charge collecting, current collecting, and/or coupling components to provide electrical power from the battery pack 110 to various systems or components of the vehicle 100. In one or more implementations, the vehicle 100 may include control circuitry such as a power stage circuit that can be used to convert DC power from the battery pack 110 into AC power for one or more components and/or systems of the vehicle (e.g., including one or more power outlets of the vehicle). The power stage circuit can be provided as part of the battery pack 110 or separately from the battery pack 110 within the vehicle 100.

Figure 1B:
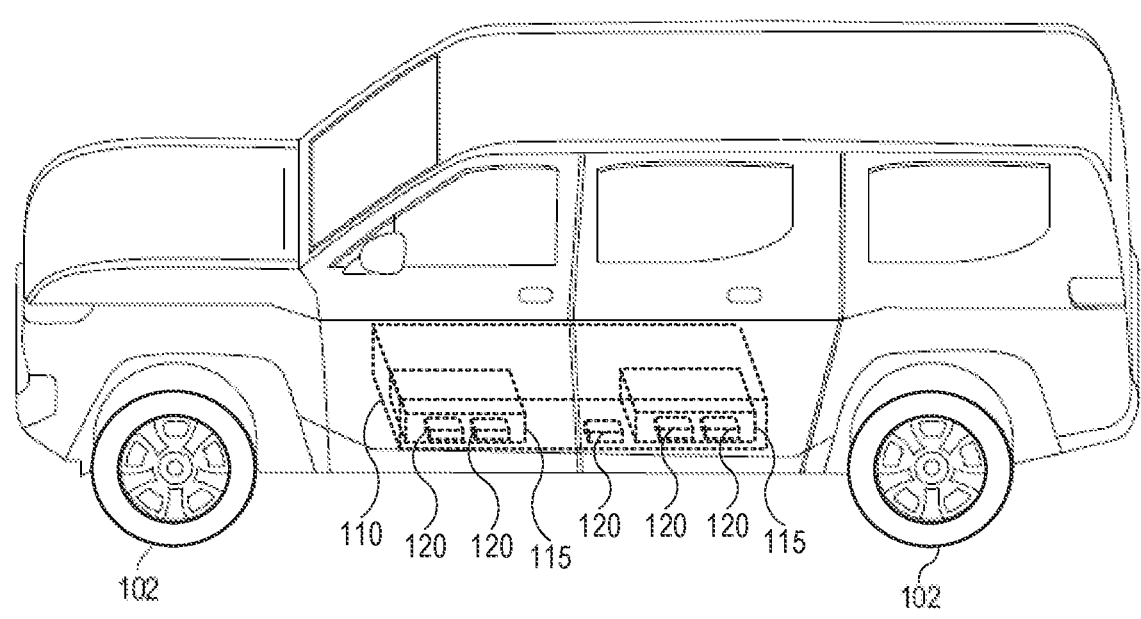

FIG. 1B illustrates another implementation in which the vehicle 100 is implemented as a sport utility vehicle (SUV), such as an electric sport utility vehicle. In the example of FIG. 1B, the vehicle 100 may include a cargo storage area that is enclosed within the vehicle 100 (e.g., behind a row of seats within a cabin of the vehicle 100). In other implementations, the vehicle 100 may be implemented as another type of electric truck, an electric delivery van, an electric automobile, an electric car, an electric motorcycle, an electric scooter, an electric bicycle, an electric passenger vehicle, an electric passenger or commercial truck, a hybrid vehicle, an aircraft, a watercraft, and/or any other movable device having a battery pack 110 (e.g., a battery pack or other battery unit that powers the propulsion or drive components of the moveable device).

Figure 1C:
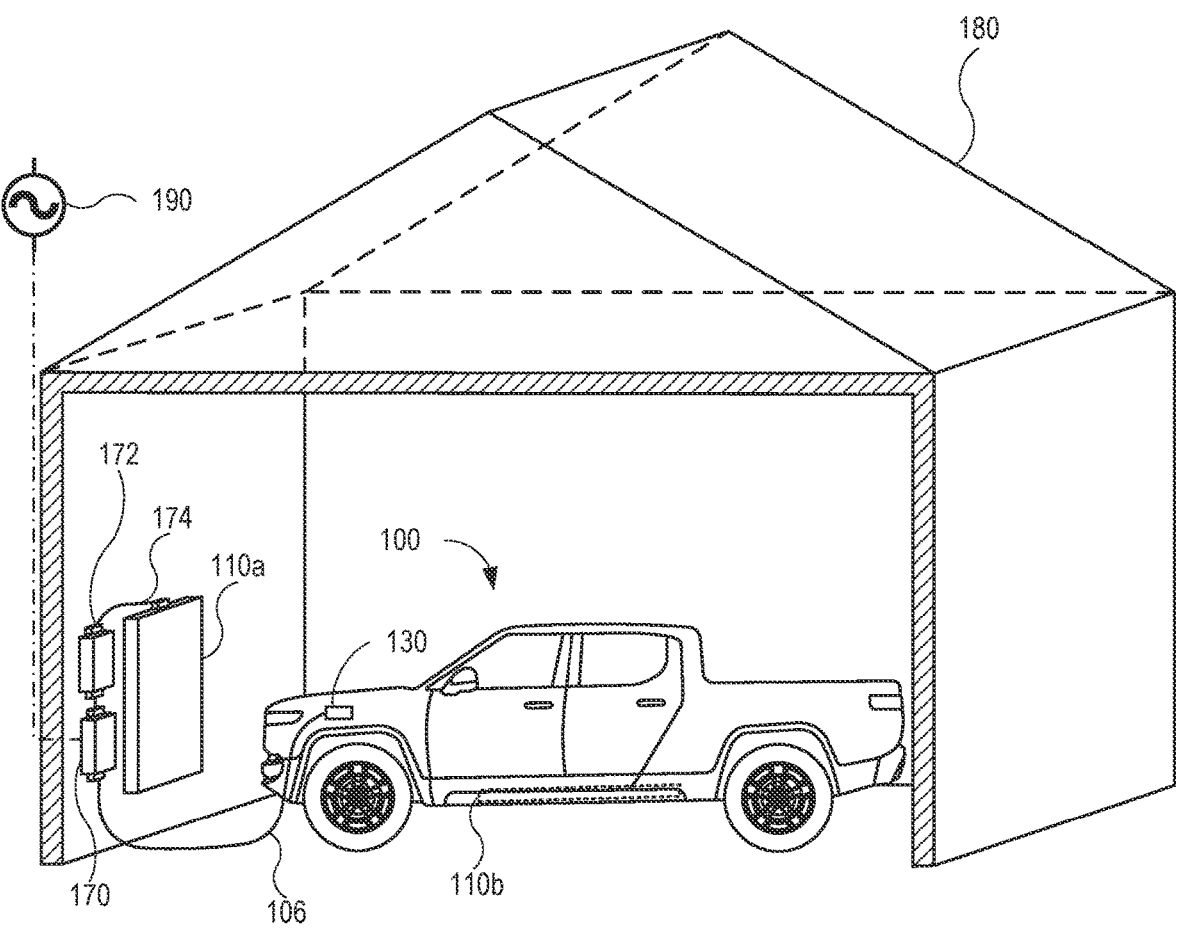
FIG. 1C illustrates a schematic perspective view of a building having a battery pack, in accordance with one or more implementations of the present disclosure.

In one or more implementations, the battery pack 110, battery modules 115, battery cells 120, and/or any other battery unit as described herein may also, or alternatively, be implemented as an electrical power supply and/or energy storage system in a building, such as a residential home or commercial building. For example, FIG. 1C illustrates an example in which a battery pack 110a is implemented in a building 180. The building 180 may be a residential building, a commercial building, or any other building. As shown, in one or more implementations, the battery pack 110a may be mounted to a wall of the building 180.

As shown, the battery pack 110a that is installed in the building 180 may be coupled (e.g., electrically coupled) to the battery pack 110b in the vehicle 100, such as via a cable/connector 106 that can be connected to a charging port 130 of the vehicle 100, an electric vehicle supply equipment 170 (EVSE), a power stage circuit 172, and/or a cable/connector 174. For example, the cable/connector 106 may be coupled to the EVSE 170, which may be coupled to the battery pack 110a via the power stage circuit 172, and/or may be coupled to an external power source 190. In this way, either the external power source 190 or the battery pack 110a may be used as an external power source to charge the battery pack 110b in some use cases. In one or more implementations, the battery pack 110a may also, or alternatively, be coupled (e.g., via a cable/connector 174, the power stage circuit 172, and the EVSE 170) to the external power source 190. The external power source 190 may take the form of a solar power source, a wind power source, and/or an electrical grid of a city, town, or other geographic region (e.g., electrical grid that is powered by a remote power plant). During, for example, instances when the battery pack 110b is not coupled to the battery pack 110a, the battery pack 110a may couple (e.g., using the power stage circuit 172) to the external power source 190 to charge up and store electrical energy. In some use cases, this stored electrical energy in the battery pack 110a may later be used to charge the battery pack 110b (e.g., during times when solar power or wind power is not available, in the case of a regional or local power outage for the building 180, and/or during a period of high rates for access to the electrical grid).

In one or more implementations, the power stage circuit 172 may electrically couple the battery pack 110a to an electrical system of the building 180. For example, the power stage circuit 172 may convert DC power from the battery pack 110a into AC power for one or more loads in the building 180. Exemplary loads coupled, via one or more electrical outlets coupled, to the battery pack 110a may include one or more lights, lamps, appliances, fans, heaters, air conditioners, and/or any other electrical components or electrical loads. The power stage circuit 172 may include control circuitry that is operable to switchably couple the battery pack 110a between the external power source 190 and one or more electrical outlets and/or other electrical loads in the electrical system of the building 180. In one or more implementations, the vehicle 100 may include a power stage circuit (not shown in FIG. 1C) that can be used to convert power received from the EVSE 170 to DC power that is used to power/charge the battery pack 110b, and/or to convert DC power from the battery pack 110 into AC power for one or more electrical systems, components, and/or loads of the vehicle 100.

In one or more use cases, the battery pack 110a may be used as a source of electrical power for the building 180, such as during times when solar power or wind power is not available, in the case of a regional or local power outage for the building 180, and/or during a period of high rates for access to the electrical grid, as non-limiting examples. In one or more other use cases, the battery pack 110b may be used to charge the battery pack 110a and/or to power the electrical system of the building 180 (e.g., in a use case in which the battery pack 110a is low on or out of stored energy and in which solar power or wind power is not available, a regional or local power outage occurs for the building 180, and/or a period of high rates for access to the electrical grid occurs, as non-limiting examples.

Figure 2A:
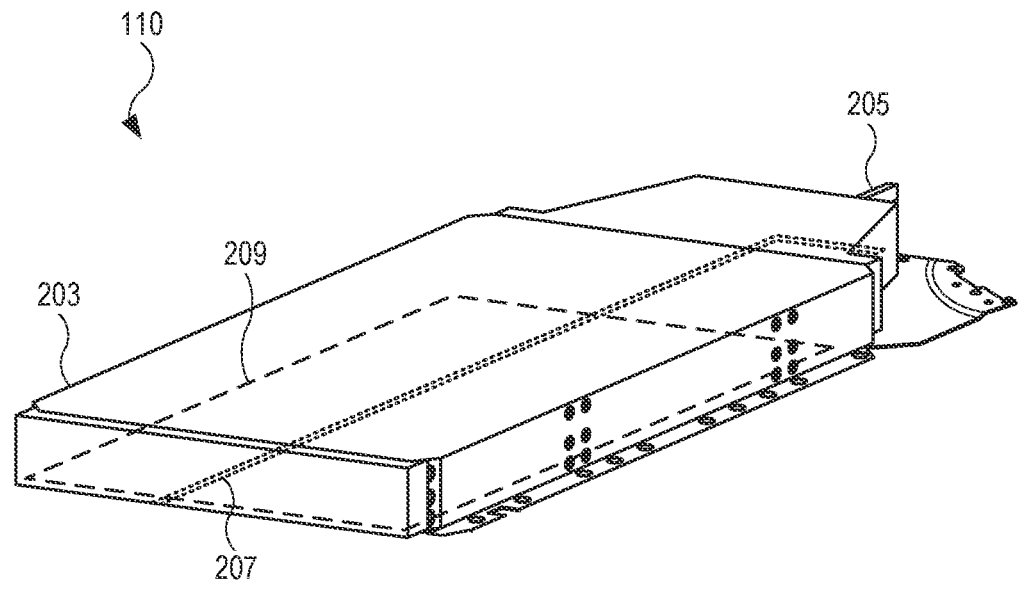
FIG. 2A illustrates a schematic perspective view of a battery pack, in accordance with one or more implementations of the present disclosure.

FIG. 2A illustrates an example of a battery pack 110. As shown, the battery pack 110 may include a battery pack frame 203 (e.g., a battery pack housing or pack frame). The battery pack frame 203 may house or enclose one or more battery modules and/or one or more battery cells, and/or other battery pack components of the battery pack 110. In one or more implementations, the battery pack frame 203 may include or form a shielding structure on an outer surface thereof (e.g., a bottom thereof and/or underneath one or more battery module, battery units, batteries, and/or battery cells) to protect the battery module, battery units, batteries, and/or battery cells from external conditions (e.g., if the battery pack 110 is installed in a vehicle and the vehicle is driven over rough terrain, such as off-road terrain, trenches, rocks, rivers, streams, etc.).

The battery pack 110 may include battery cells (e.g., directly installed within the battery pack 110, or within batteries, battery units, and/or battery modules as described herein) and/or battery modules, and one or more conductive coupling elements for coupling a voltage generated by the battery cells to a power-consuming component, such as the vehicle 100 (shown in FIGS. 1A, 1B, and 1C) and/or an electrical system of the building 180 (shown in FIG. 1C). For example, the conductive coupling elements may include internal connectors and/or contactors that couple together multiple battery cells, battery units, batteries, and/or multiple battery modules within the battery pack frame 203 to generate a desired output voltage for the battery pack 110. The battery pack 110 may also include one or more external connection ports, such as an electrical contact 205 (e.g., a high voltage terminal or connector). As shown, the battery pack 110 may include an electrical contact 205 may electrically couple an external load (e.g., the vehicle or an electrical system of the building) to the battery modules and/or battery cells in the battery pack 110. In this regard, an electrical cable (e.g., cable/connector 106) may be connected between the electrical contact 205 and an electrical system of a vehicle or a building, to provide electrical power to the vehicle or the building.

In one or more implementations, the battery pack 110 may include one or more thermal control structures 207 (e.g., cooling lines and/or plates and/or heating lines and/or plates). For example, thermal control structures 207 may couple thermal control structures and/or fluids to the battery modules, battery units, batteries, and/or battery cells within the battery pack frame 203, such as by distributing fluid through the battery pack 110. The thermal control structures 207 may form a part of a thermal/temperature control or heat exchange system that includes one or more thermal components 209, which may include plates or bladders that are disposed in thermal contact with one or more battery modules and/or battery cells disposed within the battery pack frame 203. The one or more thermal components 209 may be positioned in contact with one or more battery modules, battery units, batteries, and/or battery cells within the battery pack frame 203. The one or multiple thermal control structures 207 may be provided for each of several top and bottom battery module pairs.

Figure 2B:
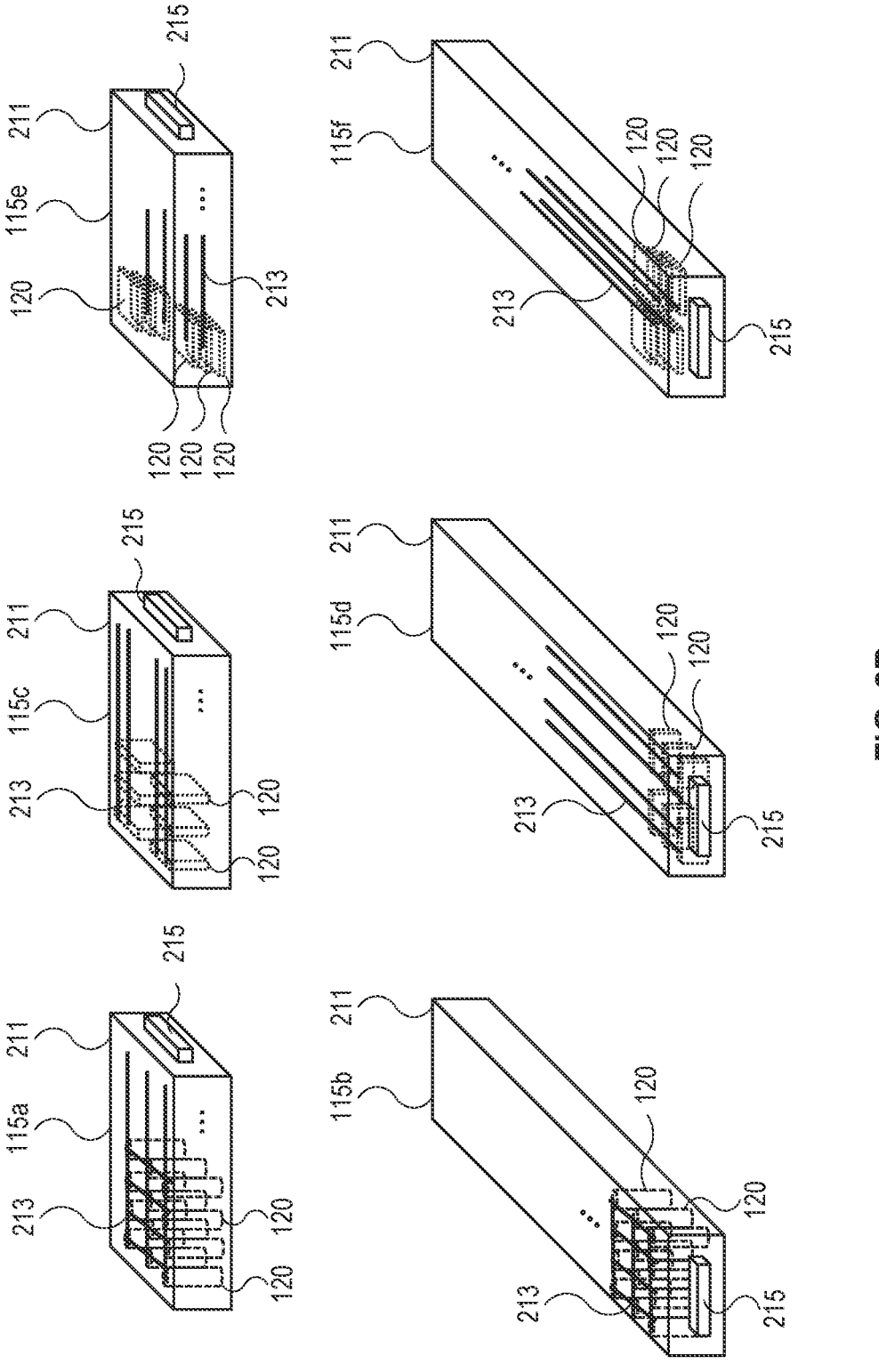
FIG. 2B illustrates schematic perspective views of various battery modules that may be included in a battery pack, in accordance with one or more implementations of the present disclosure.

FIG. 2B depicts various examples of battery modules that may be disposed in a battery pack (e.g., within the battery pack frame 203 of the battery pack 110, shown in FIG. 2A). In an example of FIG. 2B, a battery module 115*a* is shown that includes a battery module housing 211 having a rectangular cuboid shape with a length that is substantially similar to its width. In this example, the battery module 115*a* includes battery cells 120 implemented as cylindrical battery cells. The battery module 115*a* further includes rows and columns of cylindrical battery cells that are coupled together by an interconnect structure 213 (e.g., a current connector assembly or CCA). For example, the interconnect structure 213 may couple together the positive terminals of the battery cells 120, and/or couple together the negative battery terminals of the battery cells 120. As shown, the battery module 115*a* may further include a bus bar 215 that functions as a charge collector. For example, the bus bar 215 may be electrically coupled to the interconnect structure 213 to collect the charge generated by the battery cells 120 to provide a high voltage output from the battery module 115*a*.

FIG. 2B also shows a battery module 115*b* having an elongate shape. The battery module 115*b* may include a battery module housing 211 in which the length of the (e.g., extending along a direction from a front end to a rear end of the battery module housing 211) is substantially greater than a width (e.g., in a transverse direction to the direction from the front end to the rear end) of the battery module housing 211). In this regard, the battery module 115*b* (representative of one or more similar battery modules) may span the entire front-to-back length of a battery pack within a battery pack frame. As shown, the battery module 115*a* may further include an interconnect structure 213 electrically coupled to a bus bar 215, allowing the bus bar 215 may be electrically coupled to the interconnect structure 213 to collect the charge generated by battery cells 120 of the battery module 115*b* to provide a high voltage output from the battery module 115*b*.

In the implementations of battery module 115*a* and battery module 115*a*, the battery cells 120 are implemented as cylindrical battery cells. However, in other implementations, a battery module may include battery cells having other form factors, such as a battery cells having a right prismatic outer shape (e.g., a prismatic cell), or a pouch cell implementation of a battery cell. As an example, FIG. 2B also shows a battery module 115*c* having a battery module housing 211 with a rectangular cuboid shape with a length that is substantially similar to its width and including battery cells 120 implemented as prismatic battery cells. In this example, the battery module 115*c* includes rows and columns of battery cells 120 that are coupled together by an interconnect structure 213 (e.g., a current collector assembly or CCA). For example, the interconnect structure 213 may couple together the positive terminals of the battery cells 120 and/or couple together the negative battery terminals of the battery cells 120. As shown, the battery module 115*c* may include a bus bar 215 that functions as a charge collector. For example, the bus bar 215 may be electrically coupled to the interconnect structure 213 to collect the charge generated by the battery cells 120 to provide a high voltage output from the battery module 115*c*.

FIG. 2B also shows a battery module 115*d* including prismatic battery cells and having an elongate shape. For example, the battery module 115*d* includes a battery module housing 211 in which the length of the battery module housing 211 is substantially greater than a width of the battery module housing 211. In this regard, the battery module 115*d* (representative of one or more similar battery modules) may span the entire front-to-back length of a battery pack within a battery pack frame. As shown, the battery module 115*d* may also include an interconnect structure 213 and a bus bar 215 electrically coupled to the interconnect structure 213. For example, the bus bar 215 may be electrically coupled to the interconnect structure 213 to collect the charge generated by the battery cells 120 to provide a high voltage output from the battery module 115*d*.

As another example, FIG. 2B also shows a battery module 115*e* having a battery module housing 211 having a rectangular cuboid shape with a length that is substantially similar to its width. The battery module housing 211 may carry battery cells 120, each of which being implemented as pouch battery cells. In this example, the battery module 115e includes rows and columns of pouch battery cells that are coupled together by an interconnect structure 213 (e.g., a current collector assembly or CCA). For example, the interconnect structure 213 may couple together the positive terminals of the battery cells 120 and couple together the negative battery terminals of the battery cells 120. As shown, the battery module 115e may also include a bus bar 215 electrically coupled to the interconnect structure 213. For example, the bus bar 215 may be electrically coupled to the interconnect structure 213 to collect the charge generated by the battery cells 120 to provide a high voltage output from the battery module 115e.

FIG. 2B also shows a battery module 115f including pouch battery cells and having an elongate shape. For example, the battery module 115d includes a battery module housing 211 in which the length of the battery module housing 211 is substantially greater than a width of the battery module housing 211. In this regard, the battery module 115d (representative of one or more similar battery modules) may span the entire front-to-back length of a battery pack within a battery pack frame. In this regard, the battery module 115f (representative of one or more similar battery modules) may span the entire front-to-back length of a battery pack within a battery pack frame. As shown, the battery module 115f may also include an interconnect structure 213 and a bus bar 215 electrically coupled to the interconnect structure 213. For example, the bus bar 215 may be electrically coupled to the interconnect structure 213 to collect the charge generated by the battery cells 120 to provide a high voltage output from the battery module 115f.

In various implementations, a battery pack (e.g., battery pack 110 shown in FIG. 2A) may be provided with one or more of any of the battery modules 115a, 115b, 115c, 115d, 115e, and 115f. In one or more other implementations, a battery pack may be provided without any of the battery modules 115a, 115b, 115c, 115d, 115e, and 115f (e.g., in a cell-to-pack implementation).

In one or more implementations, battery modules in any of the implementations of FIG. 2B may be coupled (e.g., in series) to a current collector of a battery pack. In one or more implementations, the current collector may be coupled, via a high voltage harness, to one or more external connectors on a battery pack (e.g., electrical contact 205 of the battery pack 110, shown in FIG. 2A). In one or more implementations, a battery pack may be provided without any battery modules 115. For example, in a cell-to-pack configuration, the battery cells 120 are arranged directly into a battery pack without assembly into a battery module (e.g., without including the battery module housing 211). For example, a battery pack frame of a battery pack (e.g., the battery pack frame 203 of the battery pack 110 shown in FIG. 2A) may include or define a plurality of structures for positioning of the battery cells 120 directly within the battery pack frame.

Figure 2C:
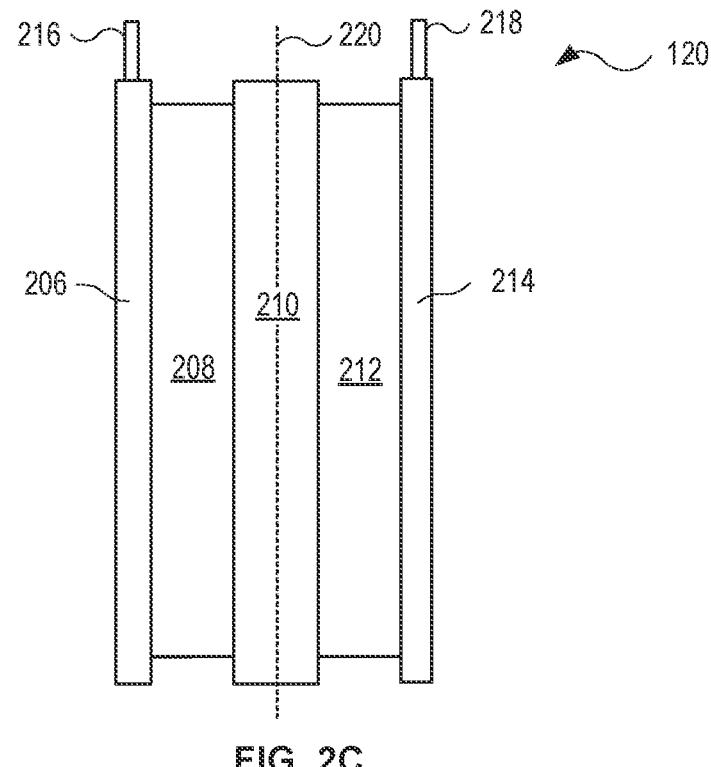
FIG. 2C illustrates a cross-sectional end view of a battery cell, in accordance with one or more implementations of the present disclosure.

FIG. 2C illustrates a cross-sectional end view of a portion of a battery cell 120. As shown, the battery cell 120 may include an anode 208, an electrolyte 210, and a cathode 212. As shown, the anode 208 may include or be electrically coupled to a first current collector 206 (e.g., a metal layer such as a layer of copper foil or other metal foil). Also, the cathode 212 may include or be electrically coupled to a second current collector 214 (e.g., a metal layer such as a layer of aluminum foil or other metal foil). The battery cell 120 may further include a terminal 216 (e.g., a negative terminal) coupled to the anode 208 (e.g., via the first current collector 206) and a terminal 218 (e.g., a positive terminal) coupled to the cathode (e.g., via the second current collector 214). In various implementations, the electrolyte 210 may take the form of a liquid electrolyte layer or a solid electrolyte layer. In one or more implementations in which the electrolyte 210 is a liquid electrolyte layer, the battery cell 120 may include a separator layer 220 that separates the anode 208 from the cathode 212. In one or more implementations in which the electrolyte 210 is a solid electrolyte layer, the electrolyte 210 may function as both separator layer and an electrolyte layer.

In one or more implementations, the battery cell 120 may be implemented as a lithium ion battery cell in which the anode 208 is formed from a carbonaceous material (e.g., graphite or silicon-carbon). In these implementations, lithium ions can move from the anode 208, through the electrolyte 210, to the cathode 212 during discharge of the battery cell 120 (e.g., and through the electrolyte 210 from the cathode 212 to the anode 208 during charging of the battery cell 120). For example, the anode 208 may be formed from a graphite material that is coated on a copper foil corresponding to the first current collector 206. In these lithium ion implementations, the cathode 212 may be formed from one or more metal oxides (e.g., a lithium cobalt oxide, a lithium manganese oxide, a lithium nickel manganese cobalt oxide (NMC), or the like) and/or a lithium iron phosphate. In an implementation in which the battery cell 120 is implemented as a lithium-ion battery cell, the electrolyte 210 may include a lithium salt in an organic solvent.

The separator layer 220 may be formed from one or more insulating materials (e.g., a polymer such as polyethylene, polypropylene, polyolefin, and/or polyamide, or other insulating materials such as rubber, glass, cellulose or the like). The separator layer 220 may prevent contact between the anode 208 and the cathode 212, and may be permeable to the electrolyte 210 and/or ions within the electrolyte 210. In one or more implementations, the battery cell 120 may be implemented as a lithium polymer battery cell having a dry solid polymer electrolyte and/or a gel polymer electrolyte.

Although some examples are described herein in which the battery cell 120 is implemented as lithium-ion battery cells, the battery cell 120 may be implemented using other battery cell technologies, such as nickel-metal hydride battery cells, lead-acid battery cells, and/or ultracapacitor cells. For example, in a nickel-metal hydride battery cell, the anode 208 may be formed from a hydrogen-absorbing alloy and the cathode 212 may be formed from a nickel oxide-hydroxide. In the example of a nickel-metal hydride battery cell, the electrolyte 210 may be formed from an aqueous potassium hydroxide in one or more examples.

The battery cell 120 may be implemented as a lithium sulfur battery cell in one or more other implementations. For example, in a lithium sulfur battery cell, the anode 208 may be formed at least in part from lithium, the cathode 212 may be formed from at least in part form sulfur, and the electrolyte 210 may be formed from a cyclic ether, a short-chain ether, a glycol ether, an ionic liquid, a super-saturated salt-solvent mixture, a polymer-gelled organic media, a solid polymer, a solid inorganic glass, and/or other suitable electrolyte materials. In various implementations, the anode 208, the electrolyte 210, and the cathode 212 can be packaged into a battery cell housing having any of various shapes, and/or sizes, and/or formed from any of various suitable materials. For example, the battery cell 120 may include a cylindrical, rectangular, square, cubic, flat, pouch, elongated, or prismatic outer shape.

Figure 2D:
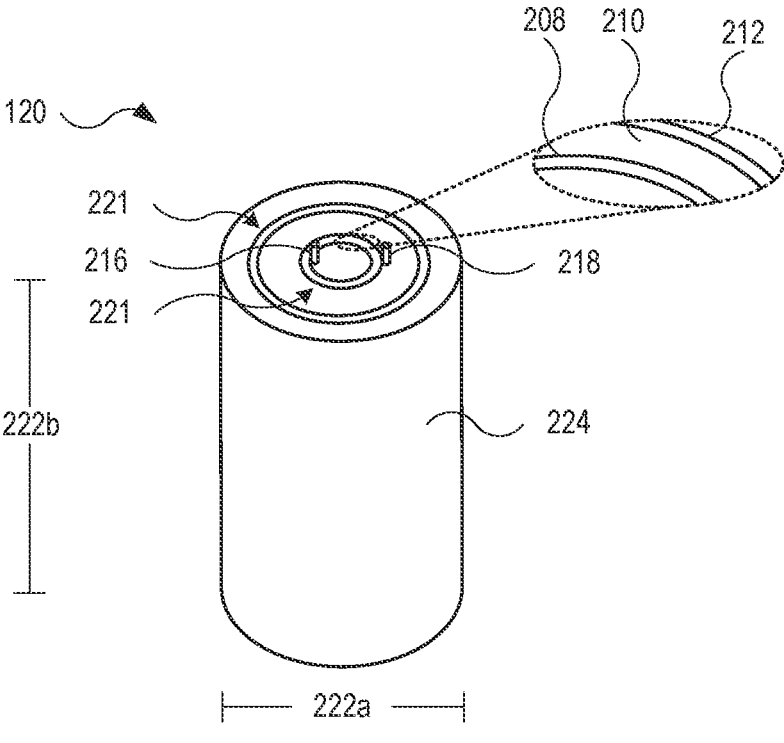
FIG. 2D illustrates a cross-sectional perspective view of a cylindrical battery cell, in accordance with one or more implementations.

As depicted in FIG. 2D, for example, a battery cell 120 may be implemented as a cylindrical cell. Accordingly, the battery cell 120 includes dimension 222a (e.g., cylinder diameter, battery cell diameter) and a dimension 222b (e.g., cylinder length). The battery cell 120, and other battery cells described herein, may include dimensional information derived from a 4-number code. For example, in some embodiments, the battery cell 120 includes an XXYY battery cell, in which "XX" refers to the dimension 222a in millimeters (mm) and "YY" refers to the dimension in mm. Accordingly, when the battery cell 120 includes a "2170" battery cell, the dimension 222a is 21 mm and the dimensions 222b is 70 mm. Alternatively, when the battery cell 120 includes a "4680" battery cell, the dimension 222a is 46 mm and the dimensions 222b is 80 mm. The foregoing examples of dimensional characteristics for the battery cell 120 should not be construed as limiting, and the battery cell 120, and other battery cells described herein with a cylindrical form factor, may include various dimension. For example, the dimension 222a and the dimension 222b may be greater than 46 mm and 80 mm, respectively.

FIG. 2D illustrates a battery cell 120 that includes a cell housing 224 having a cylindrical outer shape. As shown in the enlarged view, the anode 208, the electrolyte 210, and the cathode 212 may be rolled into one or more windings 221. The one or more windings 221 may include one or more substantially cylindrical windings, as a non-limiting example. As shown, one or more windings 221 of the anode 208, the electrolyte 210, and the cathode 212 (e.g., and/or one or more separator layers such as separator layer 220 shown in FIG. 2C) may be disposed within the cell housing 224. For example, a separator layer may be disposed between adjacent ones of the one or more windings 221. Additionally, the battery cell 120 in the cylindrical cell implementation of FIG. 2D includes a terminal 216 and a terminal 218. The terminal 218 may include a first polarity terminal, such as a positive terminal, which is coupled to the cathode 212. The terminal 216 may include a second polarity terminal, such as a negative terminal, which is coupled to the anode 208. The terminals 216 and 218 can be made from electrically conductive materials to carry electrical current from the battery cell 120 directly or indirectly (e.g., via a current carrier assembly, a bus bar, and/or other electrical coupling structures) to an electrical load, such as a component or system of a vehicle or a building shown and/or described herein. However, the cylindrical cell implementation of FIG. 2D is merely illustrative, and other implementations of the battery cells 120 are contemplated.

Figure 2E:
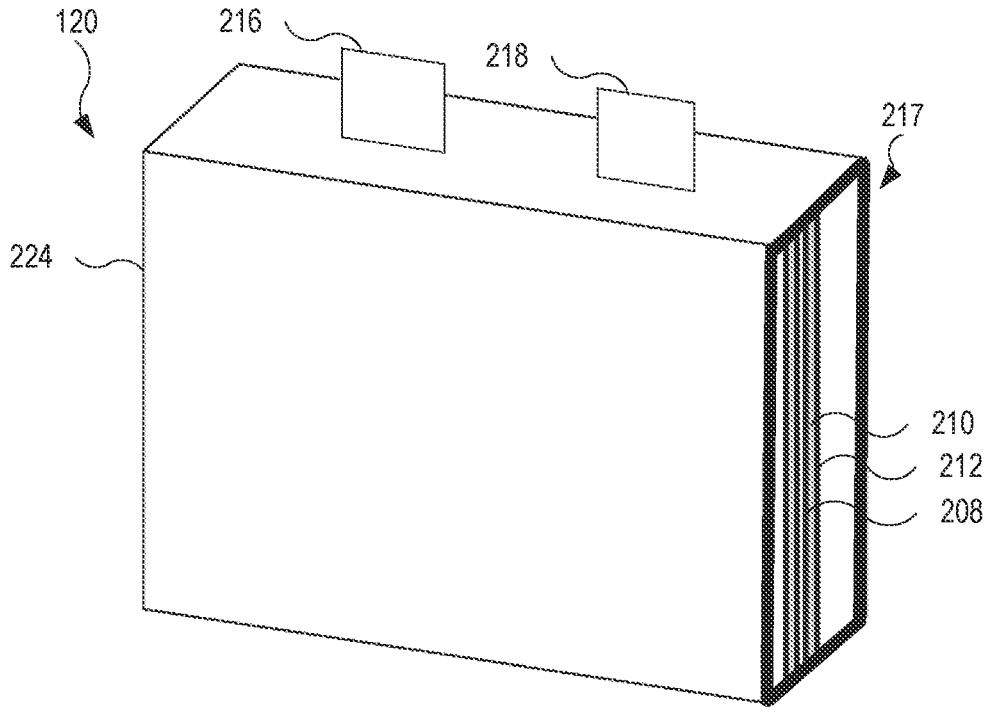
FIG. 2E illustrates a cross-sectional perspective view of a prismatic battery cell, in accordance with one or more implementations of the present disclosure.

FIG. 2E illustrates an example in which the battery cell 120 is implemented as a prismatic cell. As shown, the battery cell 120 may include a cell housing 224 having a right prismatic outer shape. Also, one or more layers of the anode 208, the cathode 212, and the electrolyte 210 disposed therebetween may be disposed (e.g., with separator materials between the layers) within the cell housing 224. As examples, multiple layers of the anode 208, electrolyte 210, and cathode 212 can be stacked (e.g., with separator materials between each layer), or a single layer of the anode 208, electrolyte 210, and cathode 212 can be formed into a flattened spiral shape and provided in the cell housing 224. The cell housing 224 may include a cross-sectional width 217 that is relatively thick and is formed from a rigid material. For example, the cell housing 224 may be formed from a welded, stamped, deep drawn, and/or impact extruded metal sheet, such as a welded, stamped, deep drawn, and/or impact extruded aluminum sheet. The cross-sectional width 217 of the cell housing 224 may be as much as, or more than 1 millimeter (mm) to provide a rigid housing for the prismatic battery cell. In one or more implementations, a terminal 216 and a terminal 218 in the prismatic cell implementation of FIG. 2E may be formed from a feedthrough conductor that is insulated from the cell housing 224 (e.g., a glass to metal feedthrough) as the conductor passes through to cell housing 224 to expose the terminal 216 and the terminal 218 outside the cell housing 224 in order to contact an interconnect structure (e.g., interconnect structure 213 shown in FIG. 2B). However, this implementation of FIG. 2E is also illustrative and yet other implementations of the battery cell 120 are contemplated.

Figure 2F:
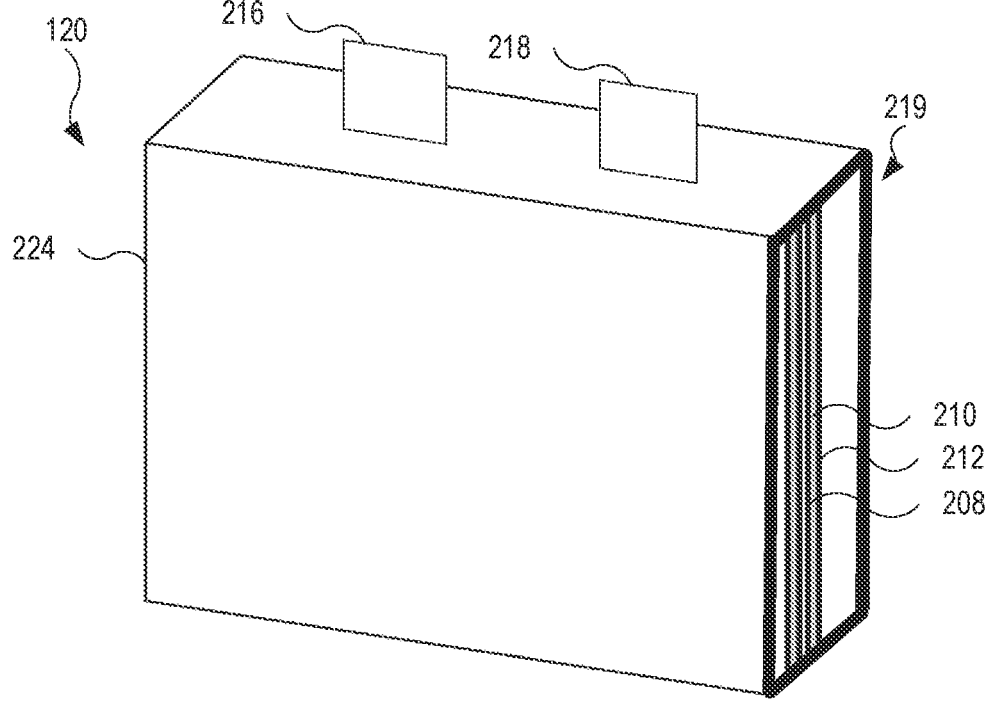
FIG. 2F illustrates a cross-sectional perspective view of a pouch battery cell, in accordance with one or more implementations of the present disclosure.

FIG. 2F illustrates an example in which the battery cell 120 is implemented as a pouch cell. As shown, the battery cell 120 may include a cell housing 224 that forms a flexible or malleable pouch housing. One or more layers of the anode 208, the cathode 212, and the electrolyte 210 disposed therebetween may be disposed (e.g., with separator materials between the layers) within the cell housing 224. In the implementation of FIG. 2F, the cell housing 224 may include a cross-sectional width 219 that is relatively thin. For example, the cell housing 224 in the implementation of FIG. 2F may be formed from a flexible or malleable material (e.g., a foil, such as a metal foil, or film, such as an aluminum-coated plastic film). The cross-sectional width 219 of the cell housing 224 may be as low as, or less than, 0.1 mm, 0.05 mm, 0.02 mm, or 0.01 mm to provide flexible or malleable housing for the pouch battery cell. In one or more implementations, a terminal 216 and a terminal 218 in the pouch cell implementation of FIG. 2F may be formed from conductive tabs (e.g., foil tabs) that are coupled (e.g., welded) to the anode 208 and the cathode 212 respectively, and sealed to the pouch that forms the cell housing 224 in these implementations. In the examples of FIGS. 2C, 2E, and 2F, the terminal 216 and the terminal 218 are formed on the same side (e.g., a top side) of the battery cell 120. However, this is merely illustrative and, in other implementations, the terminal 216 and the terminal 218 may formed on two different sides (e.g., opposing sides, such as a top side and a bottom side) of the battery cell 120. The terminal 216 and the terminal 218 may be formed on a same side or difference sides of the cylindrical cell of FIG. 2D in various implementations.

In one or more implementations, a battery module, a battery pack, a battery unit, or any other battery may include some battery cells that are implemented as solid-state battery cells and other battery cells that are implemented with liquid electrolytes for lithium-ion or other battery cells having liquid electrolytes. In one or more implementations, one or more of the battery cells may be included a battery module or a battery pack, such as to provide an electrical power supply for components of a vehicle and/or a building previously described, or any other electrically powered component or device. A cell housing of the battery cell can be disposed in the battery module, the battery pack, or installed in any of the vehicle, the building, or any other electrically powered component or device.

Figure 3:
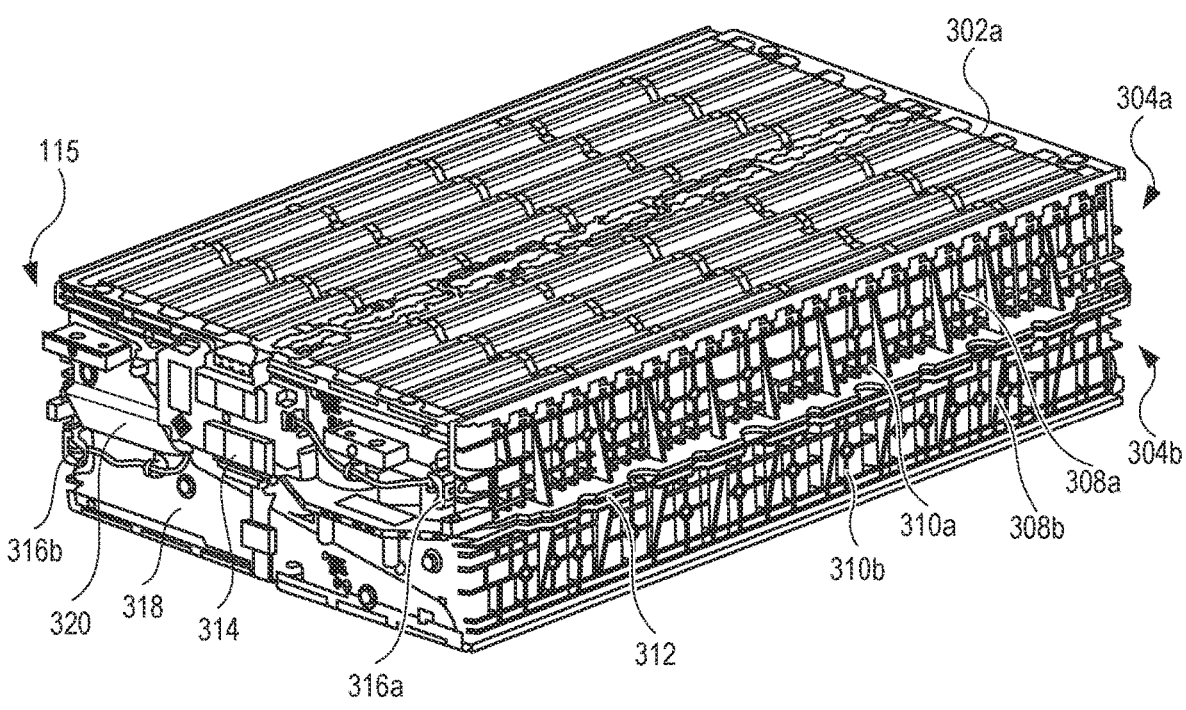
FIG. 3 illustrates a perspective view of a cover for a battery module in accordance with one or more implementations of the present disclosure.

FIG. 3 illustrates a perspective view of a cover 302a for the battery module 115 in accordance with one or more implementations of the present disclosure. The cover 302a may represent an additional cover which will be shown and described below. In the example shown in FIG. 3, the battery module 115 includes a submodule 304a and a submodule 304b. Based on their respective positions and the orientation shown in FIG. 3, the submodule 304a and the submodule 304b may be referred to as a top submodule and a bottom submodule, respectively. As shown, the submodule 304a and the submodule 304*b* may include a cell carrier 308*a* and a cell carrier 308*b*, respectively. In one or more implementations, each of the cell carriers 308*a* and 308*b* may take the form of a monolithic unitary body (e.g., a molded body formed from plastic and/or other materials), and may include a structural feature 310*a* and a structural features 310*b*, respectively, along the sidewalls of thereof. The structural features 310*a* and 310*b* may reinforce the strength of the sidewalls of the cell carriers 308*a* and 308*b*, respectively, and thereby reduce or eliminate the need for additional structural reinforcing components for the battery module 115, such as shear walls attached to the cell carriers 308*a* and 308*b*. Also, a cold plate 312 is disposed between the submodule 304*a* and the submodule 304*b*. The cold plate 312 may be in thermal contact (e.g., thermally couple) with battery cells (not visible in FIG. 3) in the submodule 304*a* and battery cells (not visible in FIG. 3) in the submodule 304*b* in order to provide thermal control for respective battery cells of both the submodule 304*a* and the submodule 304*b*.

The cover 302*a* may be disposed on a top of the battery module 115, and an additional cover (shown below, similar to the cover 302*a*) may be disposed on a bottom of the battery module 115. Also, a balancing voltage and temperature (BVT) module 314 may communicatively couple to a thermistor assembly 316*a* and to a thermistor assembly 316*b*. The BVT module 314 may take the form a modular assembly of various electrical components to monitor or control components of the battery subassembly. For example, the BVT module 314 may include a circuit board that is attached to a housing of the BVT module 314. The BVT module 314 may include various connectors to couple with, for example, a thermistor, a voltage sensor, and/or a communication device, as non-limiting examples. The thermistor may measure a temperature of the battery module 115, a battery subassembly, and/or a battery cell thereof. The voltage sensor or balancer may sense or control voltage that flows through the battery module 115, a battery subassembly, and/or a battery cell thereof. The communication device may receive, transmit, or analyze data associated with the battery module 115, a battery subassembly, and/or a battery cell thereof. Several busbars may be integrated. For example, a busbar 318 (e.g., a positive busbar) may electrically couple to respective first terminals (e.g., the positive terminals) of the battery cells of the submodule 304*a* and the submodule 304*b*, and a busbar 320 (e.g., a negative busbar) may electrically couple to respective second terminals (e.g., the negative terminals) of the battery cells of the submodule 304*a* and the submodule 304*b*.

Figure 4:
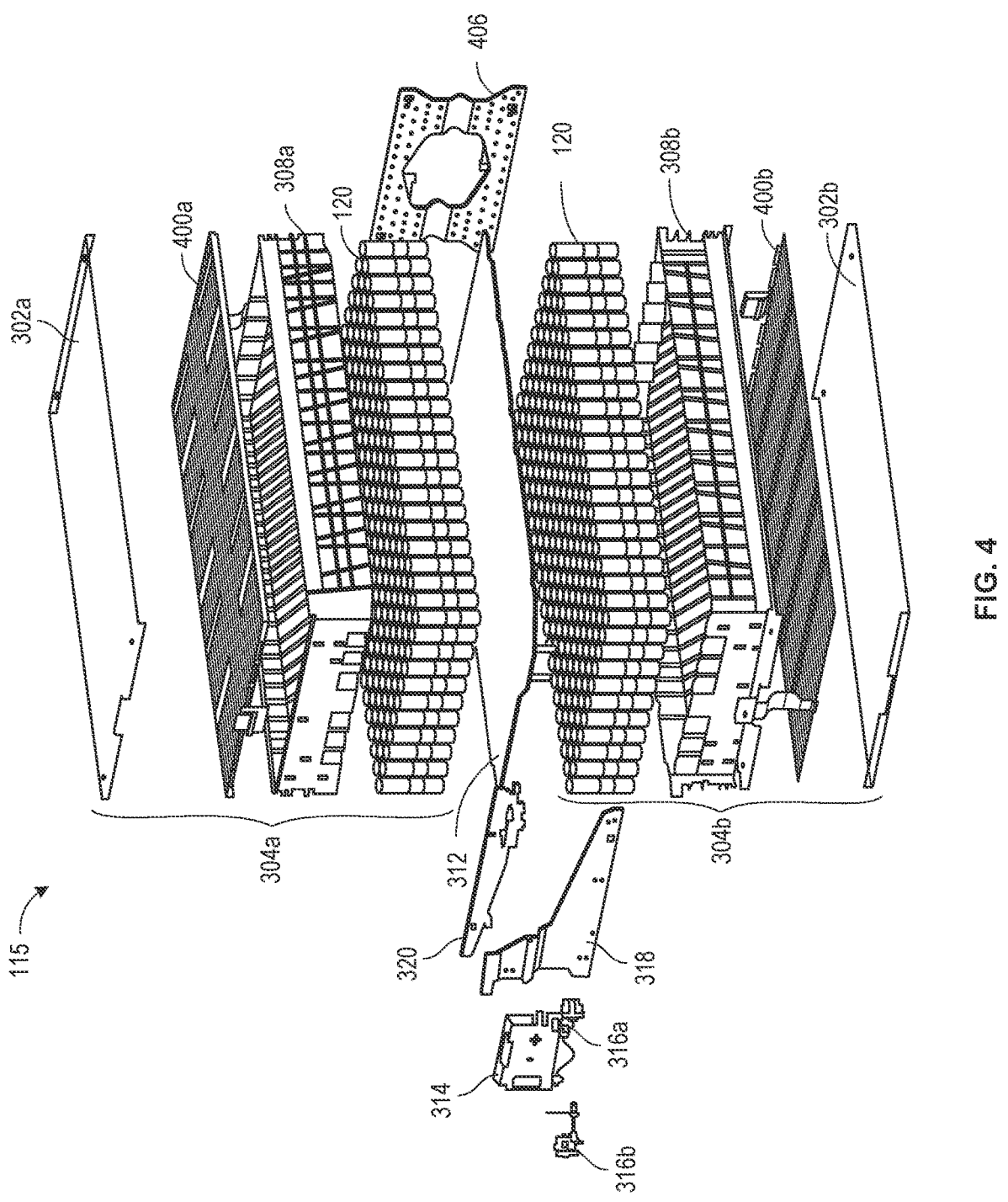
FIG. 4 illustrates an exploded perspective view of the battery module shown in FIG. 3 in accordance with one or more implementations of the present disclosure.

FIG. 4 illustrates an exploded perspective view of the battery module 115 of FIG. 3, in which the battery cells 120 of the submodule 304*a* and the battery cells 120 of the submodule 304*b* are shown. As shown, the cover 302*a* may be provided for the submodule 304*a* and a cover 302*b* may be provided for the submodule 304*b*. In one or more examples described herein, the battery module 115, a subset of the components of the battery module 115 (e.g., the submodule 304*a*, the submodule 304*b*, and/or another subset of the components of the battery module 115) shown in FIG. 3 and/or FIG. 4, or any other grouping of battery cells (e.g., including a battery pack that includes multiple battery modules and/or other battery subassemblies) may be referred to as a battery subassembly.

In the example shown in FIG. 4, a CCA 400*a* and a CCA 400*b* are also visible. As discussed in further detail hereinafter, when the battery module 115 is assembled, the CCAs 400*a* and 400*b* may each take the form of an apparatus that connects the respective terminals of the battery cells 120 of the submodule 304*a* and of the submodule 304*b* to the busbar 318 and the busbar 320. As shown in FIG. 4, a series busbar 406 may also be provided (e.g., on an opposing end of the cell carriers 308*a* and 308*b* from the end of the respective cell carriers at which the busbar 318 and the busbar 320 are mounted). For example, the series busbar 406 may electrically couple the battery cells 120 of the submodule 304*a* to the battery cells 120 of the submodule 304*b*.

The battery cells 120 of the submodule 304*a* may be inserted into a crate structure formed by the cell carrier 308*a* of the submodule 304*a*, and the battery cells 120 of the submodule 304*b* may be inserted into a crate structure formed by the cell carrier 308*b* of the submodule 304*b*. As shown in FIGS. 3 and 4, the orientation of the cell carrier 308*a* and the battery cells 120 of the submodule 304*a* may be substantially opposite (e.g., upside down with respect) to the orientation of the cell carrier 308*b* and the battery cells 120 of the submodule 304*b*. In this way, the CCA 400*a* and the CCA 400*b* may be provided at or near an outer layer of the submodule 304*a* and submodule 304*b*, respectively, for connection to the respective terminal(s) of the battery cells 120 disposed in the submodules 304*a* and 304*b*. Additionally, the cold plate 312 may thermally couple with the battery cells 120 of the submodule 304*a* and with the battery cells 120 of the submodule 304*b*. In this regard, the cold plate 312 may dissipate thermal energy from the battery cells 120 of the submodule 304*a* and from the battery cells 120 of the submodule 304*b*.

Figure 5:
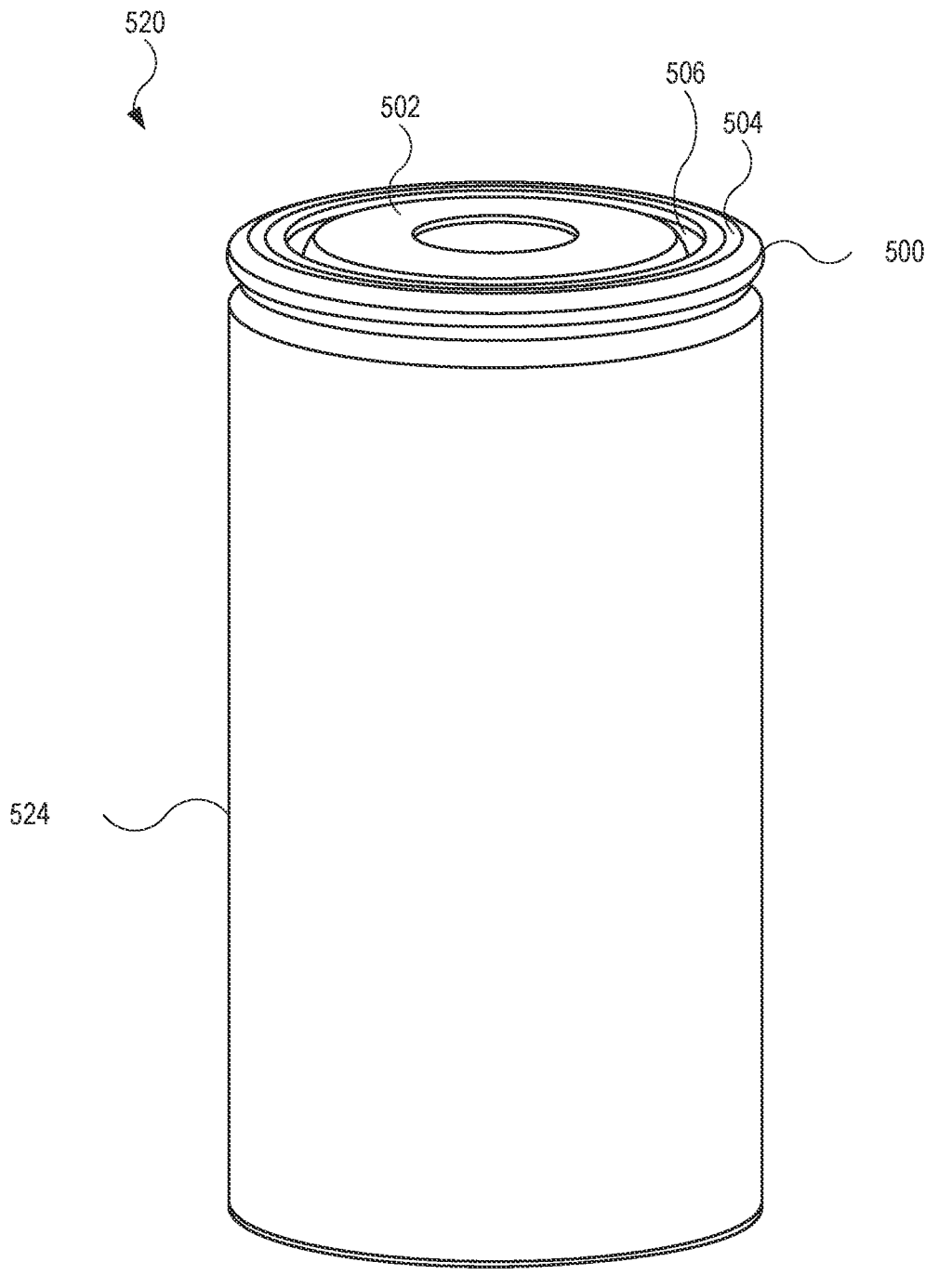
FIG. 5 illustrates a perspective view of an example battery cell in accordance with one or more implementations of the present disclosure.

FIG. 5 illustrates a perspective view of an example of a battery cell 520, implemented as a cylindrical cell with a cylindrical cell housing 524, in accordance with one or more implementations. In the example of FIG. 5, the battery cell 520 includes a cap 500 that includes a central portion 502 and a peripheral rim 504. In one or more implementations, the central portion 502 may be implemented as a terminal, such as a positive terminal of the battery cell 520. In one or more implementations, the peripheral rim 504 may be implemented as a terminal, such as a negative terminal of the battery cell 520. In one or more implementations, the battery cell 520 may include a gasket 506 that is disposed at least partially beneath the peripheral rim 504. For example, the gasket 506 may seal an internal cavity of the battery cell 520 (e.g., enclosed by the cylindrical cell housing 524 and the cap 500) from the external environment of the battery cell 520.

Figure 6:
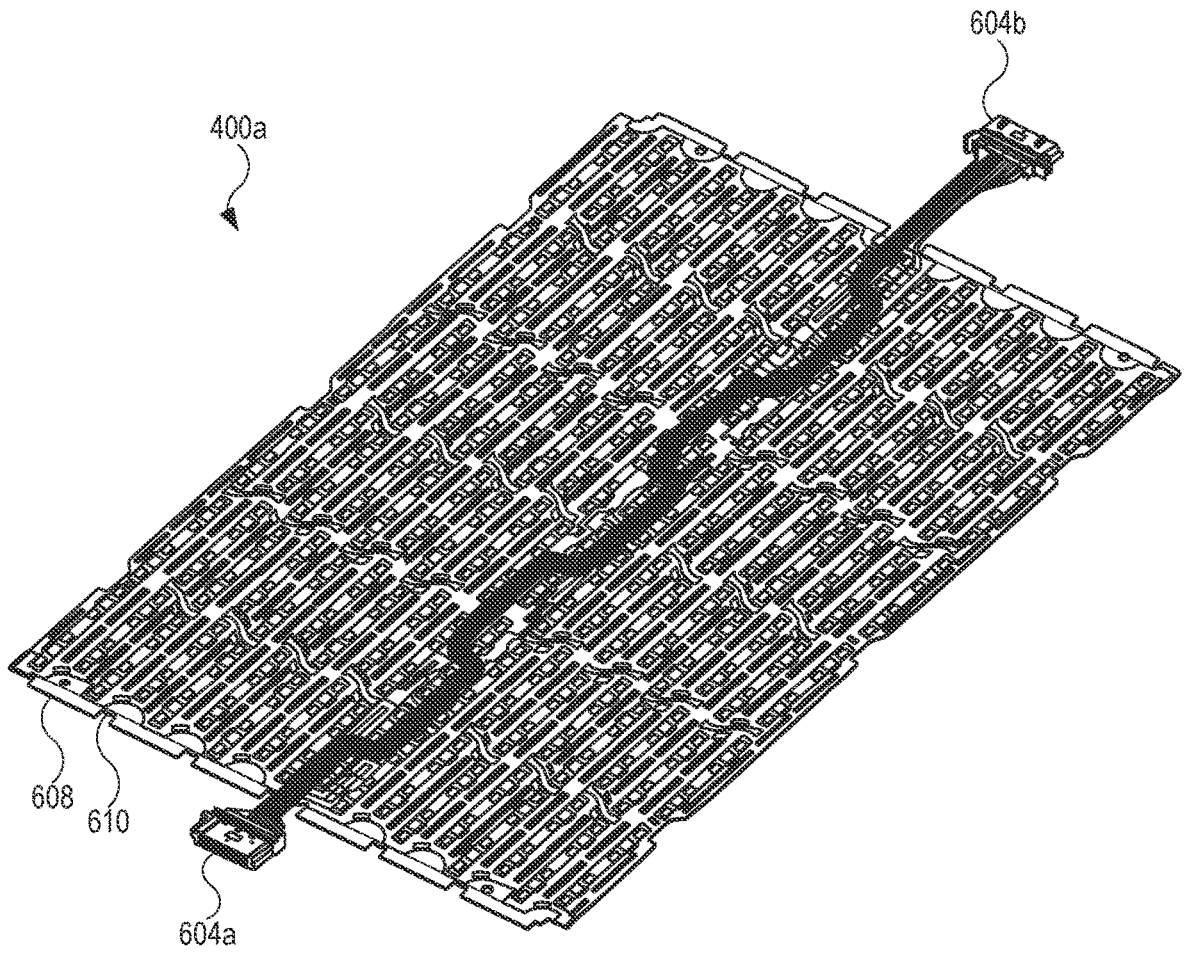
FIG. 6 illustrates a perspective view of a CCA for a battery module in accordance with one or more implementations of the present disclosure.

FIG. 6 illustrates a perspective view of a CCA 400*a* for a battery module (e.g., battery module 115) in accordance with one or more implementations. The CCA 400*a* may be representative of other CCAs shown and/or described herein, such as the CCA 400*b* shown in FIG. 4. As shown, the CCA 400*a* may include a connector 604*a* and a connector 604*b*. The connectors 604*a* and 604*b* may connect (e.g., mechanically and electrically) with another battery module or a drive unit (e.g., motor) of a vehicle, as non-limiting examples. The CCA 400*a* may further include one or more edge portions 608, and one or more notches 610 (e.g., strain relief notches) in each of the one or more edge portions 608. Although not expressly labeled in FIG. 6, the CCA 400*a* may include one or more tabs and one or more interconnects.

Figure 7:
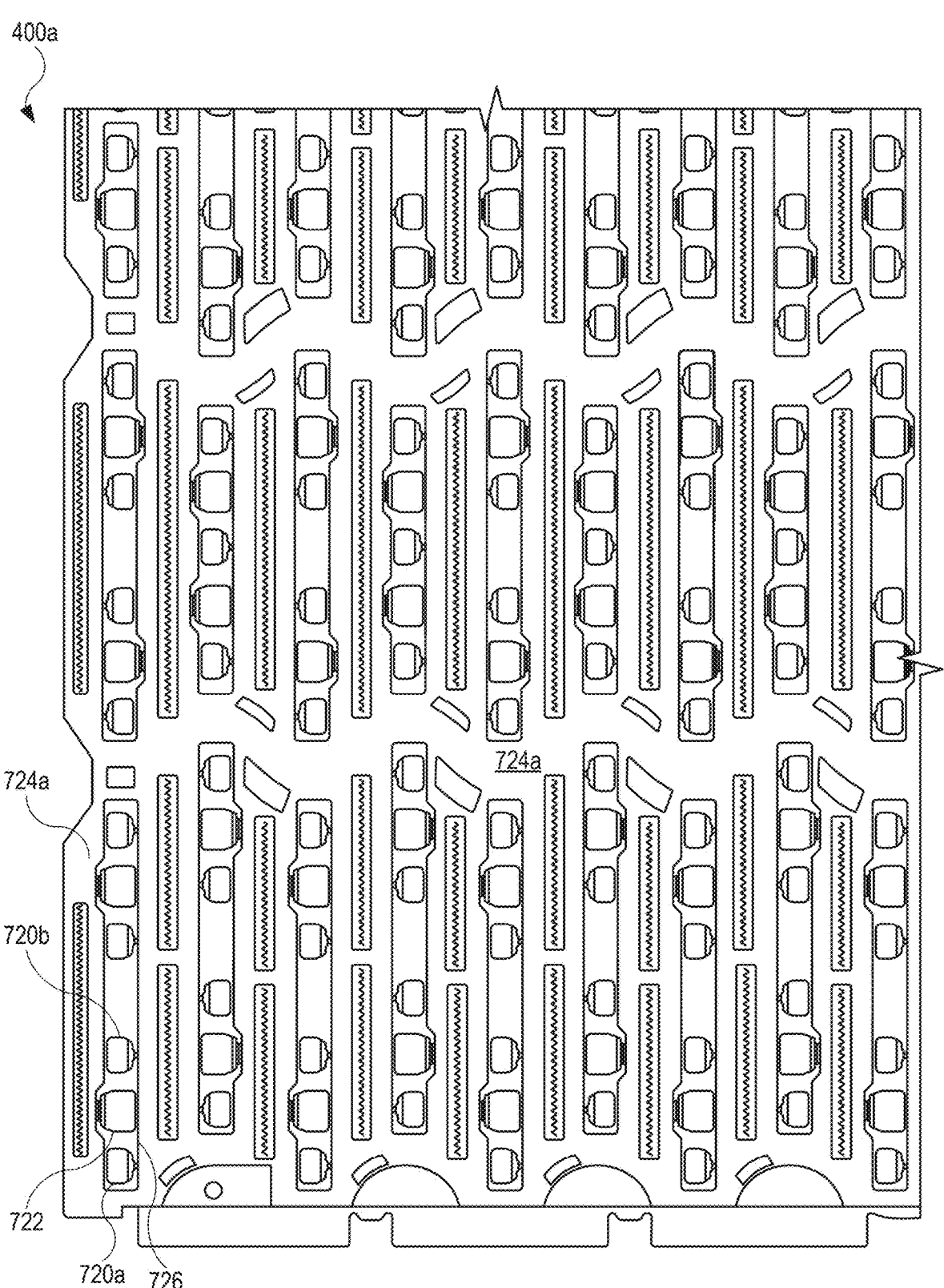
FIG. 7 illustrates an enlarged view showing a portion of a CCA, showing additional features of the CCA in accordance with one or more implementations of the present disclosure.

FIG. 7 illustrates an enlarged view showing a portion of the CCA 400*a*, showing additional features of the CCA 400*a* in accordance with one or more implementations of the present disclosure. As shown, the CCA 400*a* includes several tabs, each of which is designed to couple (e.g., electrically and mechanically couple) with one or more individual battery cells (not shown in FIG. 7). For example, the CCA 400a may include a tab 720a and 720b, each representative of additional tabs. The CCA 400a may further include a tab 722 representative of additional tabs. The tabs 720a, 720b, and 722 may form in part an electrically conductive layer (shown later) made from an electrically conductive material, such as aluminum (as a non-limiting example). Moreover, in one or more implementations, each of the tabs 720a and 720b electrically couples with respective positive terminals of battery cells, and the tab 722 electrically couples with respective negative terminals of battery cells.

The CCA 400a may further include several insulating layers. For example, the CCA 400a includes an insulating layer 724a representative of an additional insulating layer not shown in FIG. 7. The term "insulating" as used in this detailed description and in the claims refers to a non-electrically conductive layer or an electrically inert layer. In this regard, the insulating layer 724a may include a polymer-based material (or materials). In one or more implementations, the insulating layer 724a may take the form of a laminate layer that covers, or at least partially, the aforementioned electrically conductive layer. In this regard, the insulating layer 724a (and other insulating layers shown and/or described here) may be referred to as a coverlay or coverlay layer. However, the insulating layer 724a may include several openings to expose and uncover the tabs. For example, the insulating layer 724a includes an opening 726 (representative of additional openings) that exposes the tabs 720a, 720b, and 722. As a result, the tabs 720a, 720b are not covered by the insulating layer 724a.

Figure 8:
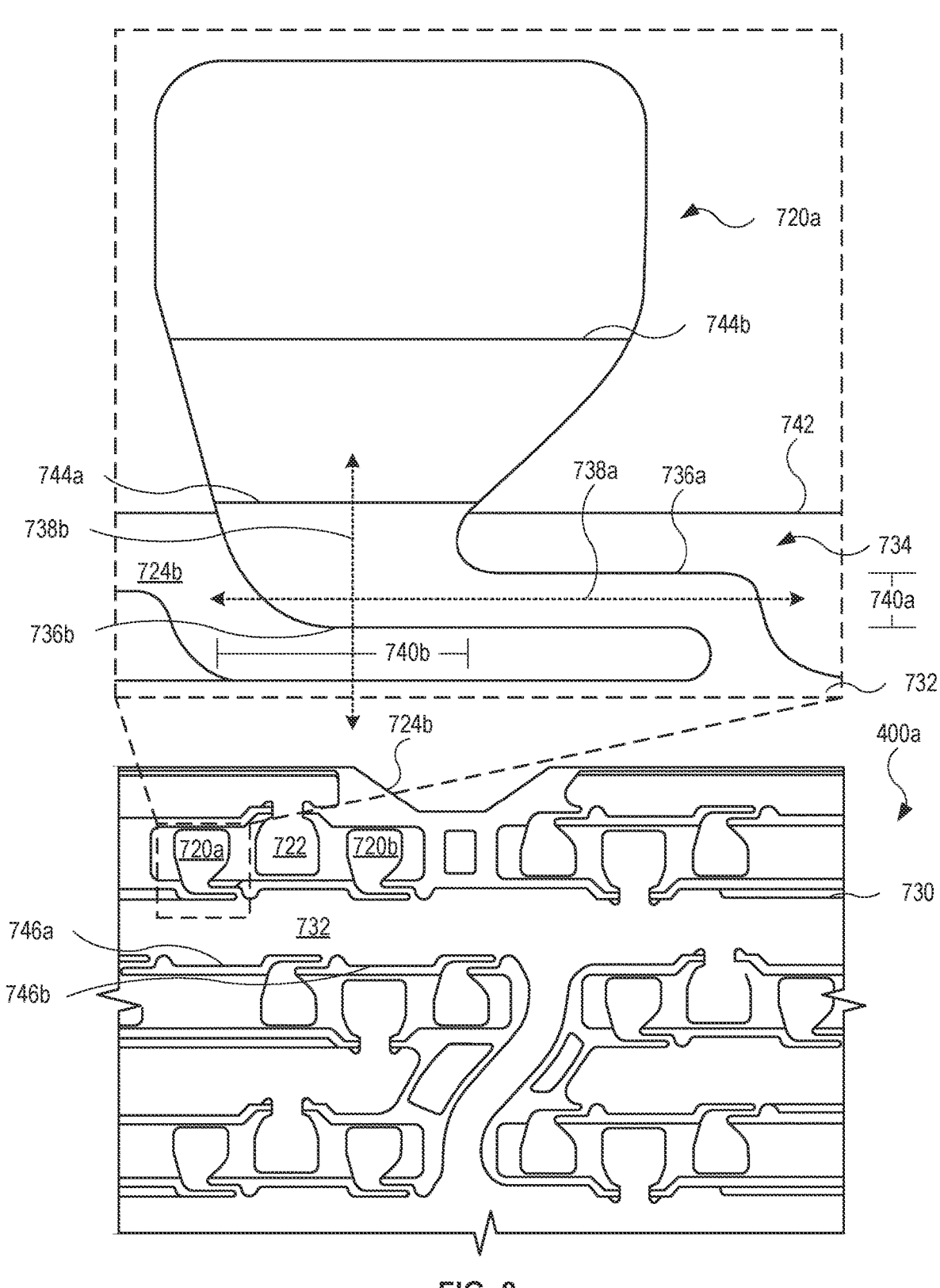
FIG. 8 illustrates an alternate enlarged view of a portion of a CCA, showing additional features of the electrically conductive layer of the CCA in accordance with one or more implementations of the present disclosure

FIG. 8 illustrates an alternate enlarged view of a portion of the CCA 400a, showing an electrically conductive layer 730 of the CCA 400a in accordance with one or more implementations of the present disclosure. For purposes of illustration, the insulation layer 724a (shown in FIG. 7) is removed to further show the electrically conductive layer 730. The electrically conductive layer 730 may include an interconnect 732 (representative of additional interconnects). The interconnect 732 may take the form of a circuit leg or branch, allowing the electrically conductive layer 730 to include additional connected features. For example, the interconnect 732 is connected to the tabs 720a, 720b, and 722. Additionally, the electrically conductive layer 730 may take the form of multiple, discrete (e.g., disconnected) layers. When electrically coupled with battery cells, the electrically conductive layer 730 may place some battery cells in parallel (e.g., electrically in parallel) and may place some battery cells in series (e.g., electrically in series).

The CCA 400a may further include an insulation layer 724b on which the electrically conductive layer 730 is disposed. The insulation layer 724b may include any features and or characteristics previously shown and/or described for the insulation layer 724a. Moreover, the insulating layers 724a and 724b may combine to cover the electrically conductive layer 730 (including the interconnect 732), with the exception of the tabs (e.g., tabs 720a, 720b, and 722).

As shown in the enlarged view, the tab 720a is connected to the interconnect 732 by a fuse 734 (representative of similar looking fuses shown and/or described herein). The fuse 734 may include portions of various lengths and widths. For example, the fuse 734 may include a portion 736a and a portion 736b. The portion 736a extends from the interconnect 732 and transitions to the portion 736b. Conversely, the portion 736b extends from the tab 720b and transitions to the portion 736a. In this regard, the fuse 734 may be characterized as a neck, or fuse neck, that connects two regions (e.g., the tab 720a and the interconnect 732) of the electrically conductive layer 730 together.

As shown, each of the portions 736a and 736b is positioned, or at least partially positioned, between the tab 720a and the interconnect 732. Further, the portion 736a may be characterized as a straight portion that extends along an axis 738a shown as a horizontal line. The axis 738a may represent a longitudinal axis that passes through a major dimension (e.g., dimension of greatest length) of the portion 736a. Moreover, the portion 736a may be parallel (e.g., non-intersecting) with respect to the interconnect 732, whereas as the portion 736b may be non-parallel with respect to the interconnect 732. The portion 736a may include a width 740a. The width 740a may include a dimension that is measured perpendicular to the axis 738a.

Further, the portion 736b may be characterized as a curved portion that extends, or at least partially extends, along an axis 738b. In one or more implementations, the axis 738b does not represent a longitudinal axis passing through a major dimension of the portion 736b, and accordingly, a width 740b (measured perpendicular to the axis 738b) of the portion 736b may be greater (e.g., in terms of dimension) than a length of the portion 736b. Further, by comparison, the width 740b is greater (e.g., wider) than the width 740a, or conversely, the width 740a is less than the width 740b. For example, the width 740a may be approximately in the range of 0.65 millimeters (mm) to 0.85 mm. In one or more implementations, the width 740a is 0.75 mm (i.e., less than 1 mm). Further, the width 740b may be approximately in the range of 3 mm to 5 mm. In one or more implementations, the width 740b is 3.5 mm (i.e., greater than 1 mm). Accordingly, the width 740b may be at least three times greater than the width 740a. In one or more implementations, the width 740b is four or more times greater than the width 740a. Further, as shown in FIG. 8, the width 740b may gradually increase as the portion 736b extends away from the insulating layer 724b and the insulating layer 724a (shown in FIG. 7). Put another way, the portion 736b may widen when extending away from the insulating layer 724b and the insulating layer 724a.

Additionally, in one or more implementations, the portion 736b may be perpendicular with respect to the portion 736a. However, in other implementations, the portion 736b is non-perpendicular with respect to the portion 736a. Additionally, the portion 736a may greater (e.g., longer) than the portion 736b, as measured along their respective axes (e.g., axes 738a and 738b).

In one or more implementations, the thickness of the electrically conductive layer 730 is approximately 150 micrometers. Accordingly, the electrically conductive layer 730 may be relatively thin. However, the increased dimension (e.g., the width 740b) of the fuse 734 may increase the likelihood of the fuse 734 remaining intact when exposed to various applied forces. In order to further protect the electrically conductive layer 730, the insulating layer 724b may cover, including fully cover, the portion 736a (e.g., the thinner portion of the fuse 734). Similarly, when coupled with the insulating layer 724b, the insulating layer 724a (shown in FIG. 7) may also cover, including fully cover, the portion 736a. Thus, the insulating layers 724a and 724b provide further protection to the fuse 734. However, the portion 736b (e.g., the wider portion of the fuse 734) may extend, or at least partially extend, from the insulating layers 724a and 724b. For example, the insulating layer 724b may include an edge portion 742 and the portion 736b may extend beyond the edge portion 742. The edge portion 742 may represent a similar edge portion of the insulating layer 724*a* (shown in FIG. 7) that aligns with the edge portion 742. In this regard, part of the portion 736*b* may be covered by the insulation layer 724*a* and 724*b* and part of the portion 736*b* may be uncovered, or at least partially uncovered, by the insulating layers 724*a* and 724*b*.

In order for the tab 720*a* to be moved/positioned closer to a battery cell (not shown in FIG. 8), the tab 720*a* may include several fold lines, or simply folds. For example, the tab 720*a* may include a fold line 744*a*. As shown, the fold line 744*a* is external to, or outside, the edge portion 742 of the insulating layer 724*b*, as well as around a corresponding edge portion of the insulating layer 724*a* (shown in FIG. 7). In this regard, the tab 720*a* may bend, at the fold line 744*a*, over or around the edge portion 742 of the insulating layer 724*b*, as well as over a corresponding edge portion of the insulating layer 724*a* (shown in FIG. 7). Additionally, the tab 720*a* may include a fold line 744*b* that allows the tab 720*a*, thereby allowing the tab 720*a* to lie on a terminal of a battery cell.

Also, the electrically conductive layer 730 may include several thermal collectors. For example, the electrically conductive layer 730 may include a thermal collector 746*a* and a thermal collector 746*b* (each representative of additional thermal collectors of the electrically conductive layer 730). Each of the thermal collectors 746*a* and 746*b* may represent additional material of the electrically conductive layer 730, in the form of tabs or extensions, designed to receive thermal energy (e.g., heat). The thermal energy may be generated by a conversion from electrical energy, which may occur during use of the CCA 400*a* collecting electrical current from and/or routing electrical current to the battery cells (e.g., battery cells 120). Beneficially, due in part to the thermal collectors 746*a* and 746*b*, the electrically conductive layer 730 is less susceptible to overheating and breaking down.

Figure 9:
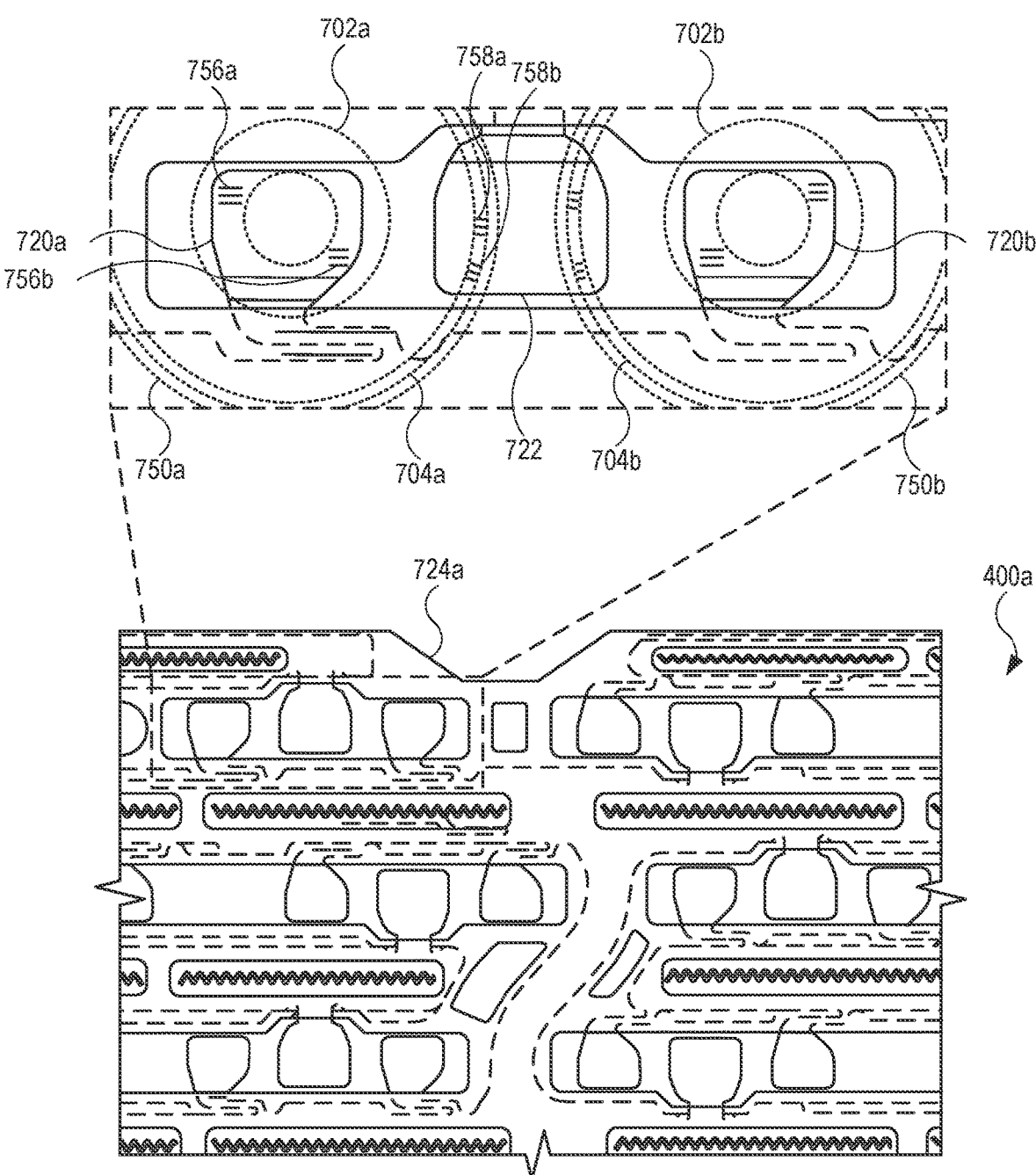
FIG. 9 illustrates an alternate enlarged view of a portion of a CCA, showing electrical connections between the electrically conductive layer and battery cells in accordance with one or more implementations of the present disclosure.

FIG. 9 illustrates an alternate enlarged view of a portion of the CCA 400*a*, showing electrical connections between the electrically conductive layer 730 and battery cells in accordance with one or more implementations of the present disclosure. The insulating layer 724*a* may be disposed on the electrically conductive layer 730 and the insulating layer 724*b* (shown in FIG. 8). In this regard, the insulating layers 724*a* and 724*b* may combine to cover the electrically conductive layer 730 with the exception of the tabs (e.g., tabs 720*a*, 720*b*, and 722).

As shown in the enlarged view, the tab 720*a* and the tab 720*b* are connected (e.g., electrically and mechanically connected) to a battery cell 750*a* and a battery cell 750*b*, respectively. Each of the battery cells 750*a* and 750*b* may include any features shown and/or described for the battery cell 120 (shown in FIG. 5). In this regard, the battery cell 750*a* and the battery cell 750*b* may include a central portion 702*a* and a central portion 702*b*, respectively. Each of the central portions 702*a* and 702*b* may be implemented as a terminal (e.g., a positive terminal). As a result, the tab 720*a* may electrically couple with the central portion 702*a* to electrically couple the electrically conductive layer 730 with a positive terminal of the battery cell 750*a* at the tab 720*a* of the electrically conductive layer 730. Similarly, the tab 720*b* may electrically couple with the central portion 702*b* to electrically couple the electrically conductive layer 730 with a positive terminal of the battery cell 750*b* at the tab 720*b* of the electrically conductive layer 730.

Further, the battery cell 750*a* and the battery cell 750*b* may include a peripheral rim 704*a* and a peripheral rim 704*b*, respectively. Each of the peripheral rims 704*a* and 704*b* may be implemented as a terminal (e.g., a negative terminal). As shown in FIG. 9, the tab 722 may electrically couple with the each of the peripheral rims 704*a* and 704*b* to electrically couple the electrically conductive layer 730 with respective negative terminals of the battery cell 750*a* at the tab 720*a* of the electrically conductive layer 730.

In order to electrically and mechanically couple tabs with battery cells, a welding operation may be used. In this regard, a weld 756*a* and a weld 756*b* electrically and mechanically connect the tab 720*a* to the central portion 702*a*. Further, a weld 758*a* and a weld 758*b* electrically and mechanically connect the tab 720*a* to the peripheral rim 704*a*. Similar welds (not labeled) may be used between the tab 720*b* and the battery cell 750*b*.

Figure 10:
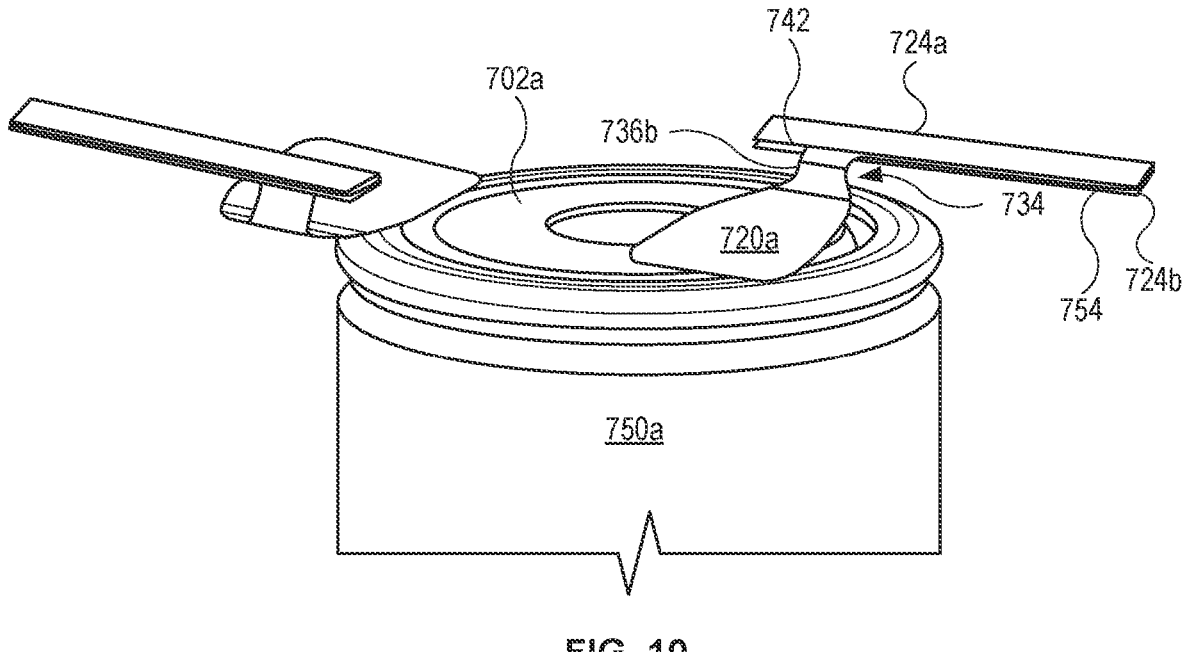
FIG. 10 illustrates an alternate perspective view of the fuse extending form the insulating layers in accordance of one or more implementations of the present disclosure.

FIG. 10 illustrates an alternate perspective view of the fuse 734 extending from the insulating layers 724*a* and 724*b* in accordance of one or more implementations of the present disclosure. The fuse 734, including the portion 736*b* (e.g., the relatively wider portion of the fuse 734) may extend from the insulating layers 724*a* and 724*b*. Moreover, the fuse 734, including the portion 736*b*, may bend over an edge portion 754 of the insulating layer 72*b*, thus allowing the tab 720*a* to couple (e.g., electrically and mechanically couple) with the battery cell 750*a* at the central portion 702*a*. Providing the fuse 734 with a relatively wider amount of material (e.g., the portion 736*b* of the fuse 734) may enhance structural reliability of the electrically conductive layer 730 (e.g., shown in FIGS. 8 and 9). Beneficially, the electrically conductive layer 730 is less likely to undergo failure due to issues related to the fuse 734, and the CCA 400*a* (e.g., shown in FIGS. 8 and 9) may be better equipped for electrical energy collection and distribution from battery cells, and charging performance for the battery cells.

Figure 11:
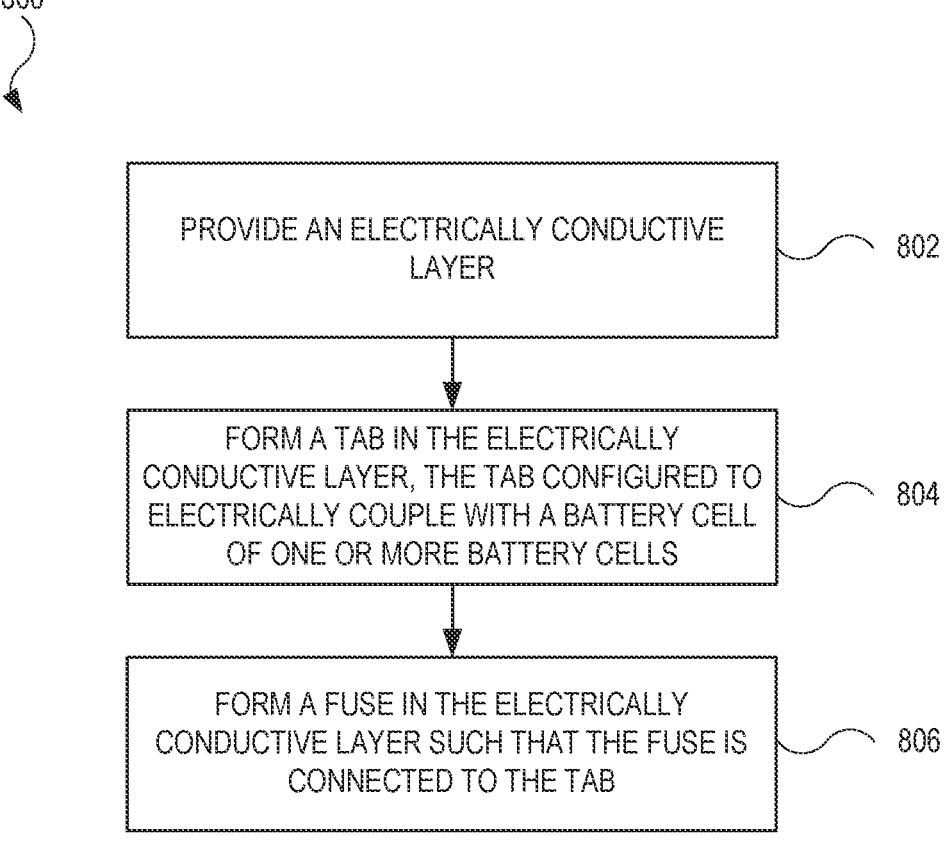
FIG. 11 illustrates a flow diagram showing an example of a process that may be performed for forming a current collector assembly in accordance with one or more implementations of the present disclosure.

FIG. 11 illustrates a flow diagram showing an example of a process 800 that may be performed for forming a current collector assembly, in accordance with implementations of the present disclosure. For explanatory purposes, the process 800 primarily described herein with reference to the CCAs and/or electrically conductive layers shown and/or described in FIGS. 4-10 and the accompanying portions of this detailed description. However, the process 800 is not limited to the CCAs and/or electrically conductive layers shown and/or described in FIGS. 4-10, and one or more blocks (or operations) of the process 800 may be performed by one or more other components of other suitable moveable apparatuses, devices, or systems. Further for explanatory purposes, some of the blocks of the process 800 are described herein as occurring in serial, or linearly. However, multiple blocks of the process 800 may occur in parallel. In addition, the blocks of the process 800 need not be performed in the order shown and/or one or more blocks of the process need not be performed and/or can be replaced by other operations.

At block 802, an electrically conductive layer is provided. The electrically conductive layer may include a metal sheet (e.g., aluminum metal sheet) with several modular layers positioned between insulating layers.

At block 804, a tab is formed in the electrically conductive layer. The tab (representative of additional tabs) is configured to electrically couple with a battery cell of one or more battery cells. While the electrically conductive layer is positioned between the insulating layers, the tab may extend from and be uncovered by the insulating layers based on respective openings of the insulating layers.

At block 806, a fuse is formed in the electrically conductive layer such that the fuse is connected to the tab. The fuse may include a first portion that includes a first width, and may further include a second portion that includes a second width different from the first width. The first portion may extend from an interconnect of the electrically conductive layer and the second portion may extend from the tab. In one or more implementations, the second portion is greater (e.g., wider) than the first portion.

Aspects of the subject technology can help extend the life of a battery in a vehicle by implementing a more reliable CCA. This can help facilitate the functioning of and/or proliferation of batteries, which can positively impact the climate by reducing greenhouse gas emissions.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An apparatus, comprising:
a current collector assembly comprising an electrically conductive layer, the electrically conductive layer comprising:
  a first tab configured to be electrically and mechanically connected to a first terminal of a battery cell, the first tab oriented in a first direction;
  a first fuse comprising a first portion extending, from an interconnect of the electrically conductive layer, along a first axis and having a first width perpendicular to the first axis, the first fuse further comprising a second portion connected to the first tab and extending along a second axis and having a second width perpendicular with respect to the second axis, wherein the second axis is different from the first axis, and the first portion, measured along the first axis, is longer than the second portion;
  a second tab configured to be electrically and mechanically connected to a second terminal of the battery cell, the second tab oriented in a second direction different from the first direction;
  a first insulating layer that covers a first surface of first portion; and
  a second insulating layer that covers a second surface of first portion, the second surface opposite the first surface, wherein the first insulating layer and the second insulating layer expose the first tab and the second tab.

2. The apparatus of claim 1, wherein:
the second insulating layer comprises an edge portion, and
the second portion bends over the edge portion.

3. The apparatus of claim 1, wherein:
the first portion comprises a straight portion parallel with respect to the interconnect and disposed between the interconnect and the first tab, and the second portion is non-parallel with respect to the interconnect.

4. The apparatus of claim 3, wherein the first tab, the first fuse, and the interconnect form in part the current collector assembly configured to collect electrical current from one or more battery cells, including the battery cell, electrically coupled with the current collector assembly.

5. The apparatus of claim 1, wherein:
the first width is less than 1 millimeter (mm), and
the second width is 3 to 5 mm.

6. The apparatus of claim 1, wherein:
the second tab extending from a second fuse and,
the first fuse comprises a first shape and the second fuse comprises a second shape different than the first shape.

7. The apparatus of claim 1, wherein the second tab is configured to electrically and mechanically couple with the battery cell and a second battery cell separate from the battery cell.

8. The apparatus of claim 1, wherein:
the first terminal is a positive terminal,
the second terminal is a negative terminal,
the first tab is configured to electrically and mechanically couple with the positive terminal, and
the second tab is configured to electrically and mechanically couple with the negative terminal.

9. The apparatus of claim 1, further comprising a third tab oriented in the first direction, wherein the second tab is positioned between the first tab and the third tab.

10. The apparatus of claim 1, wherein:
the first portion is parallel with respect to the interconnect, and
the second portion is perpendicular with respect to the interconnect.

11. The apparatus of claim 1, wherein the second width is greater than the first width.

12. A battery subassembly, comprising:
a current collector assembly electrically coupled with one or more battery cells, the current collector assembly comprising an electrically conductive layer that comprises:
a first tab electrically coupled with a first battery cell of the one or more battery cells;
a first fuse connected to the first tab, the first fuse comprising a first portion extending along a first direction and having a first width, the first fuse further comprising a second portion extending along a second direction different from the first direction and having a second width greater than the first width;
a second tab electrically coupled with a second battery cell of the one or more battery cells;
a second fuse connected to the second tab;
an interconnect, wherein the first portion of the fuse is connected to the interconnect and the second fuse is connected to the interconnect;
a thermal collector that extends from the interconnect and is configured to receive thermal energy generated in the electrically conductive layer, wherein the thermal collector is positioned between the first fuse and the second fuse;

a first insulating layer that covers a first surface of the first portion; and
a second insulating layer that covers a second surface of the first portion, wherein the second portion is at least partially uncovered by the first insulating layer and the second insulating layer.

13. The battery subassembly of claim 12, wherein:
the first tab is configured to electrically and mechanically couple with a positive terminal of the first battery cell, and
the second tab is configured to electrically and mechanically couple with a negative positive terminal of the second battery cell.

14. The battery subassembly of claim 12, wherein the first portion is enclosed by the first insulating layer and the second insulating layer.

15. The battery subassembly of claim 14, wherein the second portion gradually widens as the second portion extends away from the first insulating layer and the second insulating layer.

16. The battery subassembly of claim 12, wherein:
the first portion is parallel with respect to the interconnect, and
the second portion is perpendicular with respect to the interconnect.

17. The battery subassembly of claim 12, wherein the second width is at least three times greater than the first width.

18. A vehicle, comprising:
a battery subassembly comprising a current collector assembly electrically coupled with one or more battery cells, the current collector assembly comprising:
a tab electrically coupled with a battery cell of the one or more battery cells; and
a fuse connected to the tab, the fuse comprising a first portion extending along a first direction and having a first width, the fuse further comprising a second portion extending along a second direction different from the first direction and having a second width greater than the first width;
a first insulating layer; and
a second insulating layer, wherein the first portion is enclosed by the first insulating layer and the second insulating layer, and the second portion extends from the first insulating layer and the second insulating layer, wherein the second portion widens from the second width as the second portion extends away from the first insulating layer and the second insulating layer, and wherein:
the second insulating layer comprises an edge portion, and
the second portion bends over the edge portion.

19. The vehicle of claim 18, wherein the first portion is perpendicular with respect to the second portion.

20. The vehicle of claim 18, wherein the tab is electrically coupled with a positive terminal of the battery cell.

* * * * *